(12) United States Patent
Xie

(10) Patent No.: US 8,891,388 B2
(45) Date of Patent: Nov. 18, 2014

(54) PATH NODE DETERMINING METHOD, MEDIA PATH ESTABLISHING METHOD, AND SIGNALING MEDIA GATEWAY

(75) Inventor: Zhenhua Xie, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 351 days.

(21) Appl. No.: 13/133,296

(22) PCT Filed: Dec. 8, 2008

(86) PCT No.: PCT/CN2008/073383
§ 371 (c)(1),
(2), (4) Date: Jun. 7, 2011

(87) PCT Pub. No.: WO2010/066074
PCT Pub. Date: Jun. 17, 2010

(65) Prior Publication Data
US 2011/0243149 A1    Oct. 6, 2011

(51) Int. Cl.
*H04L 12/58* (2006.01)
*H04L 29/06* (2006.01)

(52) U.S. Cl.
CPC .......... *H04L 65/1016* (2013.01); *H04L 65/105* (2013.01); *H04L 65/104* (2013.01); *H04L 65/1033* (2013.01); *H04L 65/103* (2013.01); *H04L 65/1069* (2013.01)
USPC .......................................... 370/252; 370/410

(58) Field of Classification Search
USPC ......... 370/230, 252, 254, 255, 329, 389, 392, 370/395.52, 400, 401
See application file for complete search history.

(56) References Cited

U.S. PATENT DOCUMENTS

2004/0196867 A1* 10/2004 Ejzak et al. ................... 370/468
2010/0098093 A1*  4/2010 Ejzak ............................ 370/401

FOREIGN PATENT DOCUMENTS

CN    1758649 A    4/2006
CN    1859636 A   11/2006

(Continued)

OTHER PUBLICATIONS

English Translation of PCT International Preliminary Report on Patentability, including Written Opinion of the International Searching Authority, for PCT/CN2008/073383, issued Jun. 14, 2011 (5 pages).

(Continued)

*Primary Examiner* — Yemane Mesfin
*Assistant Examiner* — Mon Cheri Davenport
(74) *Attorney, Agent, or Firm* — Clark & Elbing LLP

(57) ABSTRACT

The present invention provides a path node determining method, a media path establishing method and a signaling media gateway. The path node determining method comprises: for any one of the signaling media gateways in the IMS network, when receiving a first SDP offer, transmitting a first SDP offer carrying a first path parameter, wherein a network segment identifier of the signaling media gateway is added in the first path parameter of the transmitted first SDP offer; when receiving a first SDP answer for the transmitted first SDP offer, the signaling media gateway judging, according to a second path parameter in the received first SDP answer or the first path parameter in the transmitted first SDP offer, whether the signaling media gateway is a path node; and transmitting the first SDP answer which carries or does not carry the second path parameter. Through the technical solutions of the present invention, it is possible to effectively reduce the number of the nodes of a media path and save the resources of media processing equipment.

18 Claims, 12 Drawing Sheets

(56) References Cited

FOREIGN PATENT DOCUMENTS

| | | |
|---|---|---|
| WO | WO 2006/116943 A1 | 11/2006 |
| WO | WO 2008/113408 A1 | 9/2008 |

OTHER PUBLICATIONS

English Translation of PCT International Search Report for PCT/CN2008/073383, mailed Sep. 17, 2009 (2 pages).

\* cited by examiner

PATH NODE DETERMINING METHOD, MEDIA PATH ESTABLISHING METHOD, AND SIGNALING MEDIA GATEWAY

CROSS-REFERENCE TO RELATED APPLICATIONS

This application is the U.S. National Stage filing under 35 U.S.C. §371 of International Application No. PCT/CN2008/073383, filed Dec. 8, 2008.

FIELD OF THE INVENTION

The present invention relates to the technical field of mobile communication, in particular to a path node determining method, a media path establishing method and a signaling media gateway.

BACKGROUND OF THE INVENTION

IP Multimedia Subsystem (referred to as IMS) is an IP-based network architecture proposed by the 3rd Generation Partnership Project (referred to as 3GPP). The system builds an open and flexible service environment, supports multimedia applications, and is capable of providing users with abundant multimedia services.

The IMS can be divided into a control layer and a service layer. The control layer mainly includes a Call Session Control Function (referred to as CSCF) for service triggering and control, wherein the CSCF can further be divided into a Proxy CSCF (referred to as P-CSCF), an Interrogating CSCF (referred to as I-CSCF) and a Serving CSCF (referred to as S-CSCF), in which the I-CSCF and the S-CSCF are optional. The service layer mainly includes a series of Application Servers (referred to as AS) for providing specific services, wherein the AS either can be an independent entity, or can exist in the S-CSCF. It works as follows: the control layer (S-CSCF) controls the service triggering based on subscription information of the user, invokes services on the AS, and realizes service functions. Corresponding to a User Equipment (referred to as UE), the AS and the S-CSCF can be uniformly referred to as Server Equipment (referred to as SE).

Meanwhile, there exist in the IMS network a variety of gateway devices for processing IMS signaling and media, such as the P-CSCF and an Access Gateway (referred to as AGW) controlled by the P-CSCF, an Interworking Border Control Function (referred to as I-BCF) and an Interworking Border Gateway (referred to as I-BGW) controlled by the I-BCF, a Session Border Control (referred to as SBC), an Application Layer Gateway (referred to as ALG), etc. These gateways mainly serve to segment a media path, so as to achieve intercommunication between different networks, such as intercommunication between public network equipment and private network equipment, and intercommunication between entities having different encoding functions achieved by transcoding. For the convenience of description, the gateway devices capable of processing IMS signaling and media are uniformly referred to as signaling media gateway, for example, the P-CSCF and the AGW can be regarded as one signaling media gateway.

Since the goal of a session is to achieve media connection, it is required to negotiate media resource information in a session. In the IMS system, the protocol for negotiating the media resource information is a Session Description Protocol (referred to as SDP), and the mode of interaction of the protocol is an offer/answer model, viz. there must be an SDP answer for an SDP offer. The contents of the SDP offer and answer are all media resource information including information of media owner (including address information), media connection address, media type, and information of media port and codec relating to the media type, etc. In the content of the SDP answer, the number, type and sequence of media must be completely identical to those in the SDP offer. The contents of the SDP protocol are carried by a message body of a Session Initiation Protocol (SIP) message, and the process of interaction is independent from the request-response model of the SIP, that is, the request or response message of the SIP may carry an SDP offer, may carry an SDP answer, or may not carry any contents of the SDP protocol.

FIG. 1A is a schematic diagram of the existing IMS signaling and media path and the corresponding signaling flow, and describes the signaling flow during the process in which a terminal UE-A calls a terminal UE-B of the same operator network, and the final media path, wherein the UE-A and the UE-B respectively roam to different visit networks.

For the convenience of description, the figure only shows signaling media gateway entities, other IMS network entities on the call session signaling path are not described, since they only serve to forward the signaling.

As shown in FIG. 1A, S1 is a signaling interaction link between the UE-A and the P-CSCF of the visit network of the calling party, S2 is a signaling interaction link between the P-CSCF of the visit network of the calling party and the ALG of the home network of the calling and called parties, S3 is a signaling interaction link between the ALG of the home network of the calling and called parities and the S-CSCF of the home network of the calling and called parties, S4 is a signaling interaction link between the ALG of the home network of the calling and called parties and the SBC of the visit network of the called party, and S5 is a signaling interaction link between the SBC of the visit network of the called party and the called terminal UE-B. The signaling path between the UE-A and the UE-B is formed by the interconnection of S1-S2-S3-S3-S4-S5.

M1 is a media link between the UE-A and the AGW of the visit network of the calling party, M2 a media link between the AGW of the visit network of the calling party and the ALG of the home network of the calling and called parties, M3 a media link between the ALG of the home network of the calling and called parties and the SBC of the visit network of the called party, and M4 is a media link between the SBC of the visit network of the called party and the UE-B. The media path between the UE-A and the UE-B is formed by the interconnection of M1-M4.

FIG. 1B is a flow chart of the existing establishment process of the IMS signaling and media path. As shown in FIG. 1B, the following steps are mainly included:

step 101, the UE-A initiates a call to the UE-B, for example, sending an INVITE request carrying media resource information of the UE-A, specifically, the media resource information can be carried in the message body, in FIG. 1B, the media resource information is indicated by SDP1; and the request message is transmitted via the path S1;

step 102, the request message passes a signaling media gateway 1, the signaling media gateway 1 forwards the request message after substituting the media resource information in the message with the media resource information allocated by the signaling media gateway 1, in this example, the media resource information allocated by the signaling media gateway 1 is indicated by SDP2; and the request message is transmitted via the path S2;

step 103, the request message passes a signaling media gateway 2, the signaling media gateway 2 forwards the request message after substituting the media resource information in the message with the media resource information allocated by the signaling media gateway 2, in this example, the media resource information allocated by the signaling media gateway 2 is indicated by SDP3; and the request message is transmitted via the path S3, and is forwarded back by the S-CSCF;

step 104, the request message again passes the signaling media gateway 2, the signaling media gateway 2 forwards the request message after substituting the media resource information in the message with the media resource information allocated by the signaling media gateway 2, in this example, the media resource information allocated by the signaling media gateway 2 is indicated by SDP4; and the request message is transmitted via the path S4;

step 105, the request message passes a signaling media gateway 3, the signaling media gateway 3 forwards the request message after substituting the media resource information in the message with the media resource information allocated by the signaling media gateway 3, in this example, the media resource information allocated by the signaling media gateway 3 is indicated by SDP5; and the request message is transmitted via the path S5;

step 106, the request message reaches the UE-B, the UE-B returns a temporary response message, for example, sending a "183 Session Progress" response carrying the media resource information of the UE-B, for example, carrying the media resource information in the message body, in this example, the media resource information of the UE-B is indicated by SDP6; and the response message is transmitted via the path S5;

step 107, the response message passes the signaling media gateway 3, the signaling media gateway 3 forwards the request message after substituting the media resource information in the message with the media resource information allocated by the signaling media gateway 3, in this example, the media resource information allocated by the signaling media gateway 3 at this time is indicated by SDP7; and the response message is transmitted via the path S4;

step 108, the response message passes the signaling media gateway 2, the signaling media gateway 2 forwards the request message after substituting the media resource information in the message with the media resource information allocated by the signaling media gateway 2, in this example, the media resource information allocated by the signaling media gateway 2 is indicated by SDP8; and the response message is transmitted via the path S3, and is forwarded back by the S-CSCF;

step 109, the response message again passes the signaling media gateway 2, the signaling media gateway 2 forwards the request message after substituting the media resource information in the message with the media resource information allocated by the signaling media gateway 2, in this example, the media resource information allocated by the signaling media gateway 2 at this time is indicated by SDP9; and the response message is transmitted via the path S2;

step 110, the response message passes the signaling media gateway 1, the signaling media gateway 1 forwards the request message after substituting the media resource information in the message with the media resource information allocated by the signaling media gateway 1, in this example, the media resource information allocated by the signaling media gateway 1 at this time is indicated by SDP10; and the response message is transmitted via the path S1; at this point, it can be seen that, the UE-A and the signaling media gateway 1 know media resource information of each other, the signaling media gateway 1 and the signaling media gateway 2 know media resource information of each other, by analogy, as a result, the media path between the UE-A and the UE-B is divided into 5 segments, wherein one segment of the media path is from the signaling media gateway 2 to the signaling media gateway 2;

steps 111-114, the UE-B answers the call, sends an answer message, for example, sending a "200 OK", the message sequentially passes the signaling media gateways 3, 2, 2, 1, and finally reaches the UE-A, and till now, communication is established between the UE-A and the UE-B, and the media path is divided into 5 segments.

It can be concluded from the above description that, if the existing IMS media path establishing method is employed, when a media link is allowed to be established directly between the visit network of the calling party and the visit network of the called party, especially when the calling party and the called party roam to the same place and are served by the same visit network, the media path is lengthened a lot, which wastes equipment resources, and even in some cases, there may appear a media link between a certain signaling media gateway and the signaling media gateway itself.

SUMMARY OF THE INVENTION

In view of the above mentioned, the present invention provides a media path establishing method to solve the problem of equipment resource waste due to the failure in optimization of media path in the prior art.

According to one aspect of the present invention, a path node determining method is provided. The method is used to determine, in an IP Multimedia Subsystem (IMS) network which comprises multiple signaling media gateways, signaling media gateway(s) which serves as media path node(s) of one call.

The path node determining method according to the present invention comprises: for any one of the signaling media gateways in the IMS network, when receiving a first SDP offer, transmitting a first SDP offer carrying a first path parameter, wherein a network segment identifier of the signaling media gateway is added in the first path parameter of the transmitted first SDP offer; when receiving a first SDP answer for the transmitted first SDP offer, the signaling media gateway judging, according to a second path parameter in the received first SDP answer or the first path parameter in the transmitted first SDP offer, whether the signaling media gateway is a path node; and transmitting a first SDP offer which carries or does not carry the second path parameter.

According to another aspect of the present invention, a signaling media gateway is provided.

The signaling media gateway according to the present invention comprises: a first receiving module, a first modifying module, a first transmitting module, a second receiving module, a judging module, a second modifying module and a second transmitting module, wherein the first receiving module is configured to receive a first SDP offer; the first modifying module is configured to add a network segment identifier of the signaling media gateway in a first path parameter of the first SDP offer; the first transmitting module is configured to transmit the first SDP offer operated by the first modifying module; the second receiving module is configured to receive a first SDP answer; the judging module is configured to judge whether the first SDP answer received by the second receiving module carries a second path parameter, if the first SDP answer carries the second path parameter, judge whether the signaling media gateway is a path node according to the second path parameter, otherwise, judge whether the signaling media gateway is a path node according to the first path parameter of the first SDP offer transmitted by the first transmitting module; the second modifying module is configured to generate, according to the judgment result of the judging module, a first SDP answer which needs to be transmitted, and modify a second path parameter of the first SDP answer; the second transmitting module is configured to transmit the first SDP answer which carries or does not carry the second path parameter.

According to still another aspect of the present invention, a media path establishing method is provided, and the method is applied to an IMS network which comprises multiple signaling media gateways.

The media path establishing method according to the present invention comprises: for any one of the signaling media gateways in the IMS network, when receiving a first SDP offer, not modifying a media transmission address in the first SDP offer, but adding a network segment identifier of the signaling media gateway in a first path parameter of the first SDP offer, and then, transmitting the first SDP offer; when receiving a first SDP answer for the transmitted first SDP offer, the signaling media gateway judging, according to a second path parameter in the first SDP answer or the first path parameter in the transmitted first SDP offer, whether the signaling media gateway is a path node, if not, not modifying a media transmission address of the first SDP answer, but transmitting the first SDP answer; the signaling media gateway receiving an update message, if the signaling media gateway is a path node and the update message does not carry a second SDP offer, the signaling media gateway modifying the media transmission address of the received first SDP offer, carrying in the update message the modified first SDP offer which is used as a second SDP offer and transmitting the update message; and if the signaling media gateway is not a path node and the update message carries a second SDP offer, not modifying the media transmission address of the second SDP offer, but transmitting the update message; the signaling media gateway receiving an update agreement message of the update message, if the signaling media gateway is not a path node and the update agreement message carries a second SDP answer, not modifying the media transmission address of the second SDP answer, but transmitting the update agreement message.

According to still another aspect of the present invention, a signaling media gateway is provided.

The signaling media gateway according to the present invention comprises: a first receiving module, a first modifying module, a first transmitting module, a second receiving module, a judging module, a second modifying module, a second transmitting module, a third receiving module, a third modifying module, a third transmitting module, a fourth receiving module, a fourth modifying module and a fourth transmitting module, wherein the first receiving module is configured to receive a first SDP offer; the first modifying module is configured to add a network segment identifier of the signaling media gateway in a first path parameter of the first SDP offer without modifying a media transmission address of the first SDP offer; the first transmitting module is configured to transmit the first SDP offer operated by the first modifying module; the second receiving module is configured to receive a first SDP answer; the judging module is configured to judge whether the signaling media gateway is a path node according to a second path parameter if the first SDP answer carries the second path parameter or according to the first path parameter of the transmitted first SDP offer if the first SDP answer does not carry the second path parameter; the second modifying module is configured to modify the media transmission address and the second path parameter of the first SDP answer in the case that the judgment result of the judging module is that the signaling media gateway is a path node, and not modify the media transmission address and the second path parameter of the first SDP answer in the case that the judgment result of the judging module is that the signaling media gateway is not a path node; the second transmitting module is configured to transmit the first SDP answer operated by the second modifying module; the third receiving module is configured to receive an update message which carries a second SDP offer or does not carry an SDP offer; the third modifying module is configured to, in the case that the judgment result of the judging module is that the signaling media gateway is a path node, if the update message carries a second SDP offer, modify the media transmission address of the second SDP offer, otherwise, modify the media transmission address of the first SDP offer, and then, carry the modified first SDP offer or the modified second SDP offer in the update message, and in the case that the judgment result of the judging module is that the signaling media gateway is not a path node, not modify the update message; the third transmitting module is configured to transmit the update message operated by the third modifying module; the fourth receiving module is configured to receive an update agreement message of the update message, wherein the update agreement message carries the second SDP answer or does not carry an SDP answer; the fourth modifying module is configured to, in the case that the judgment result of the judging module is that the signaling media gateway is a path node, the update agreement message is sure to carry the second SDP answer, and if the update message carries a second SDP offer, modify the media transmission address of the second SDP answer, otherwise, delete the second SDP answer from the update agreement message, and in the case that the judgment result of the judging module is that the signaling media gateway is not a path node, not modify the update agreement message; and the fourth transmitting module is configured to transmit the update agreement message operated by the fourth modifying module.

Through at least one of the above solutions of the present invention, by optimizing the path, it is possible to effectively reduce the number of media path nodes, and save the resources of media processing equipment.

Other characteristics and advantages of the present invention will be explained in the following specification, and moreover, parts of them become obvious from the description, or understood by carrying out the present invention. The object and other advantages can be realized and obtained through the structure particularly mentioned in the specification, the claims, and the accompanying drawings.

BRIEF DESCRIPTION OF THE ACCOMPANYING DRAWINGS

The drawings herein are used to provide further understanding of the present invention and form a part of the specification, which are used to explain the present invention together with embodiments of the present invention rather than unduly limit the present invention. In the accompanying drawings.

Figure 4:
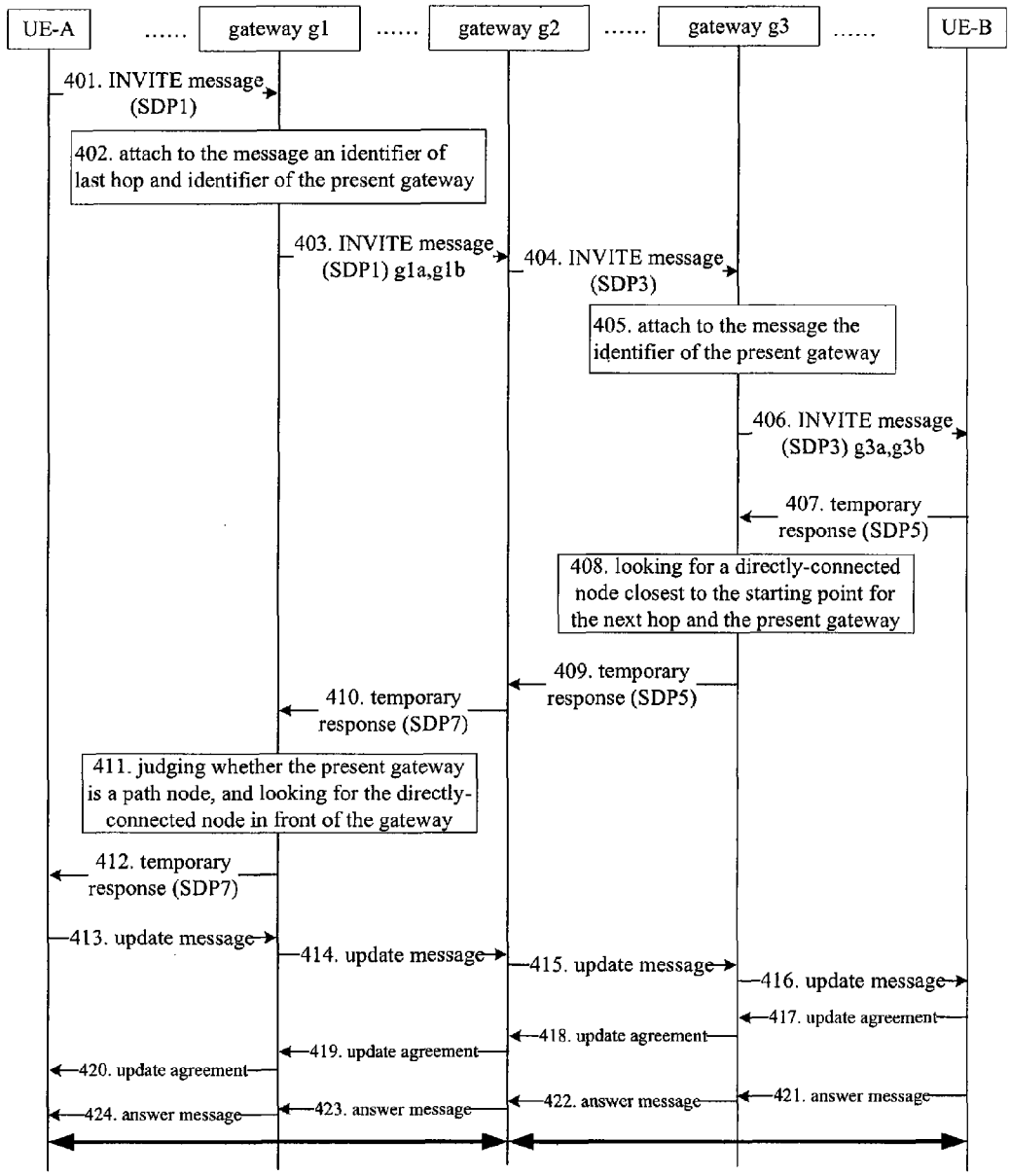
Figure 5:
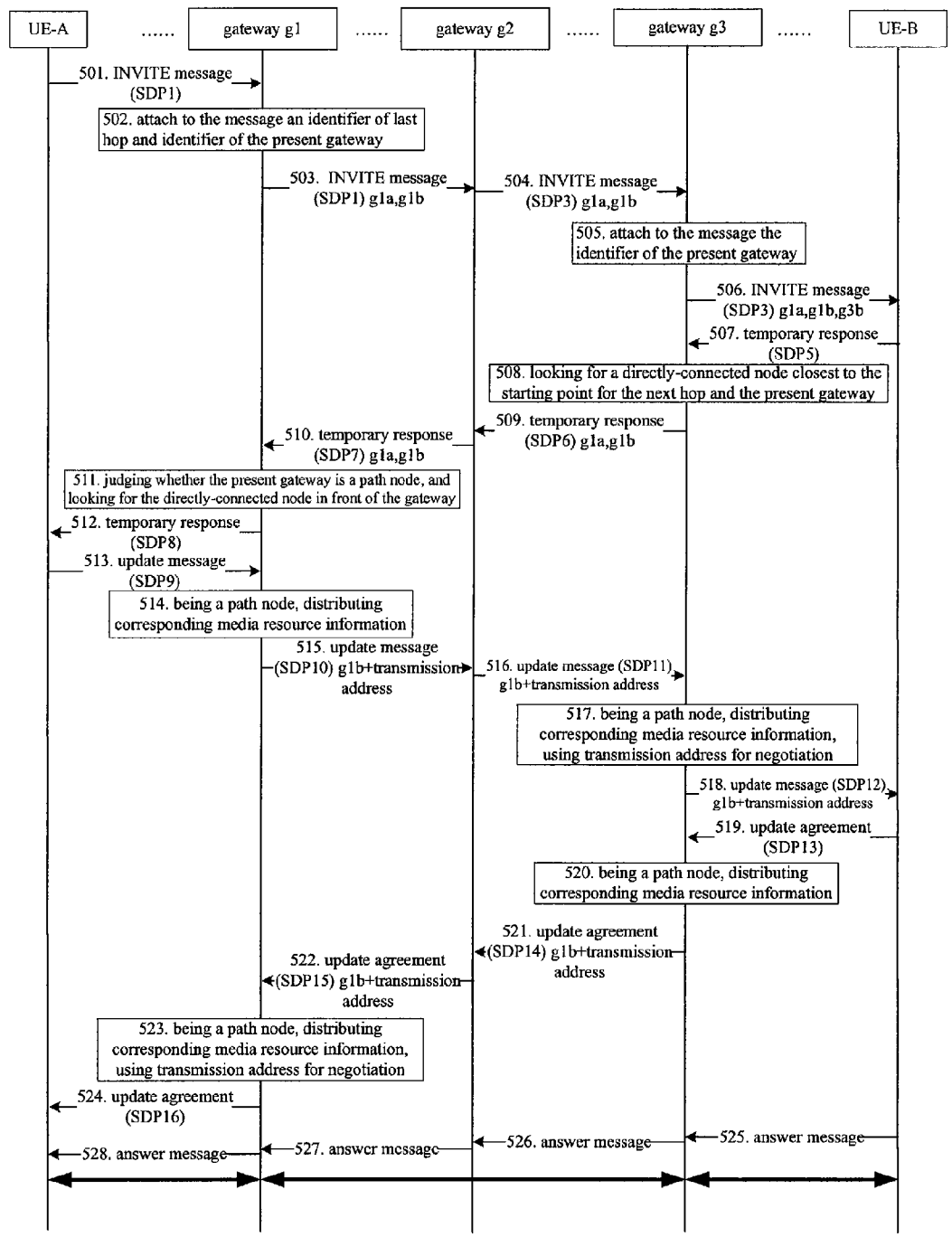
Figure 6:
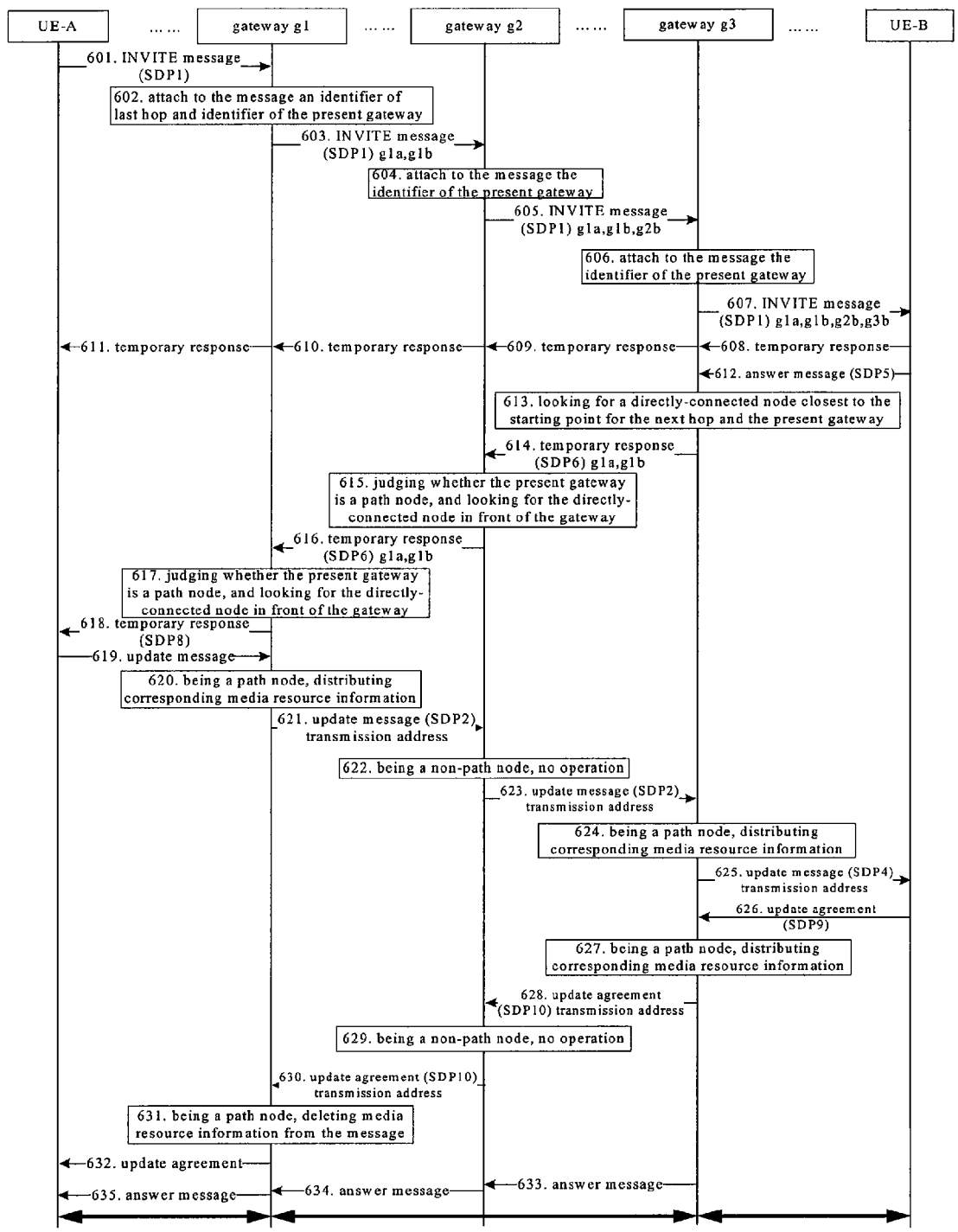
Figure 7:
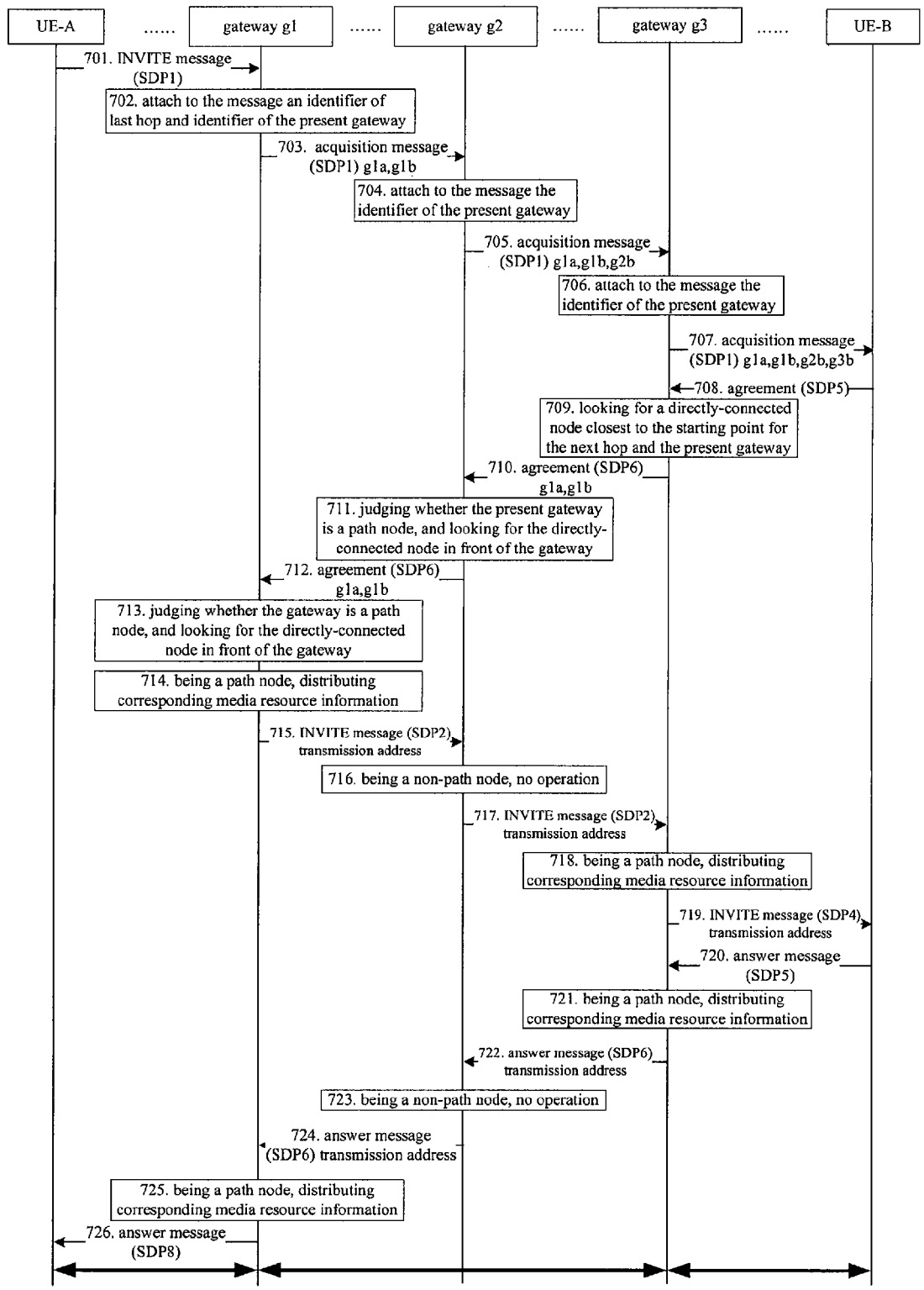
Figure 8:
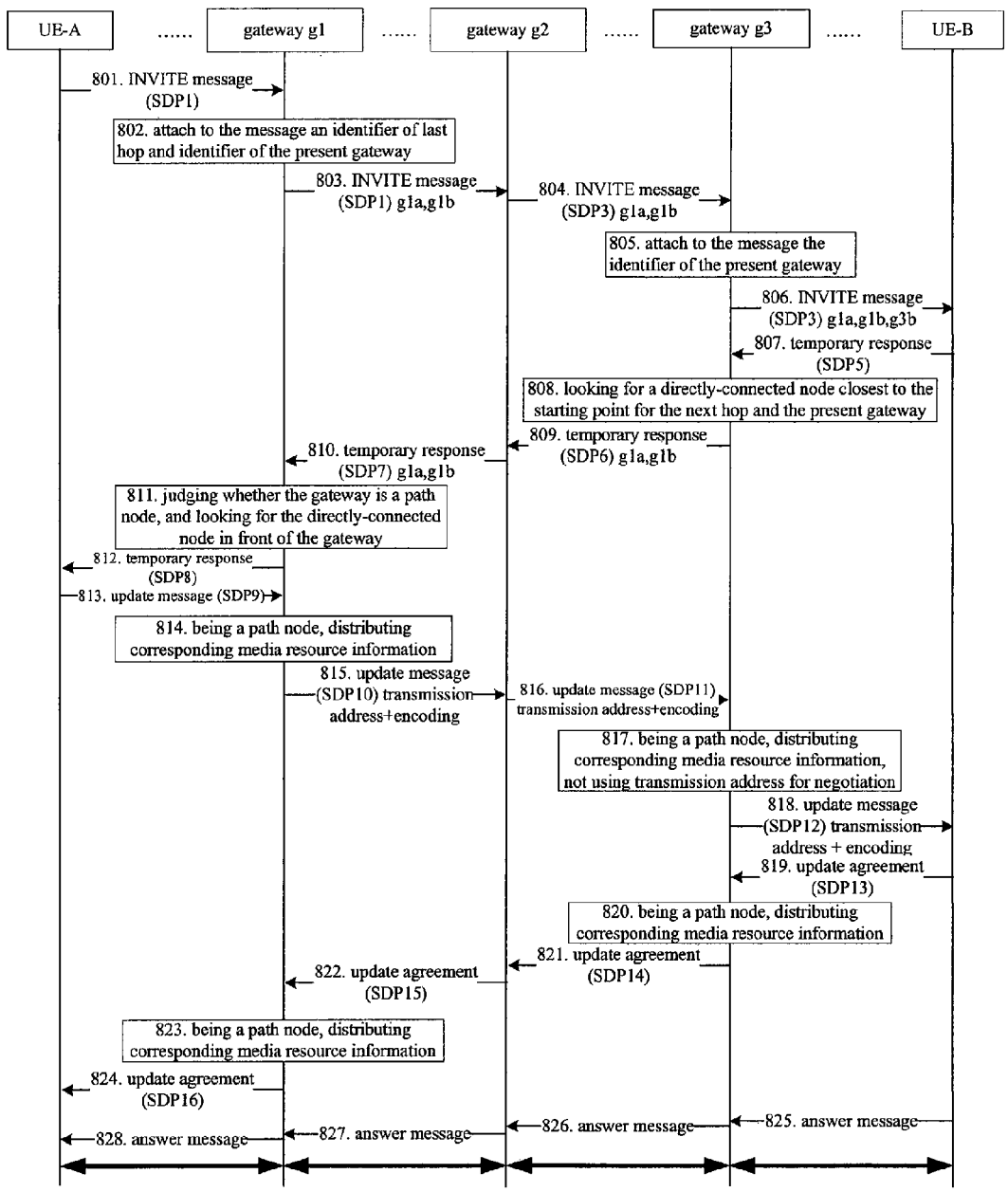
Figure 9:
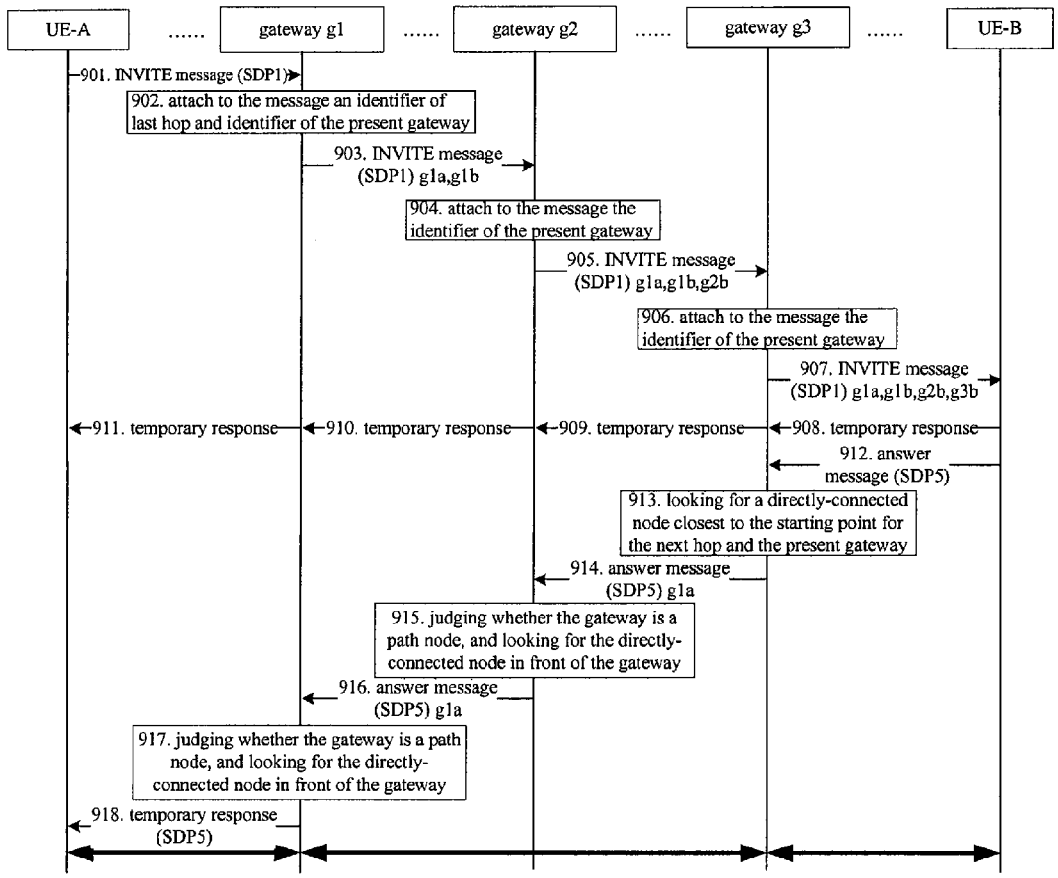
Figure 10A:
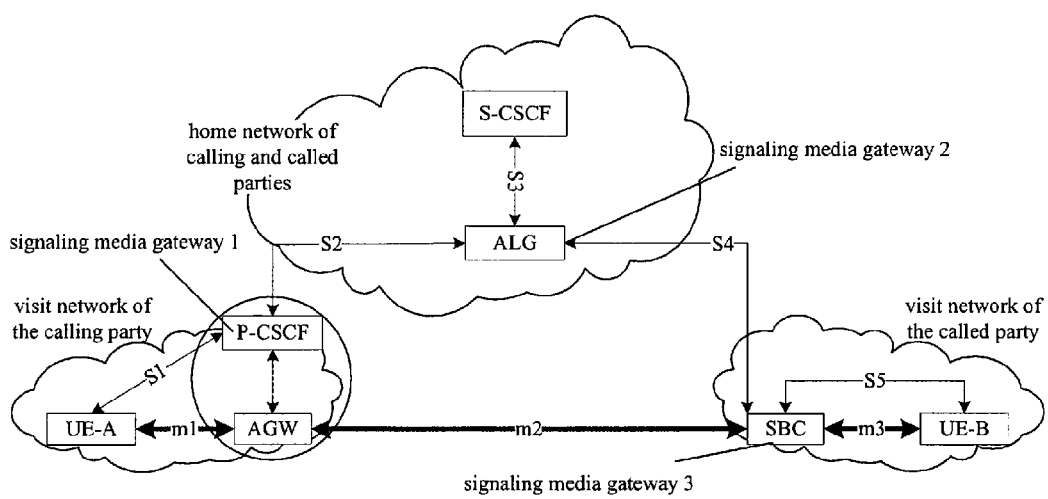
Figure 10B:
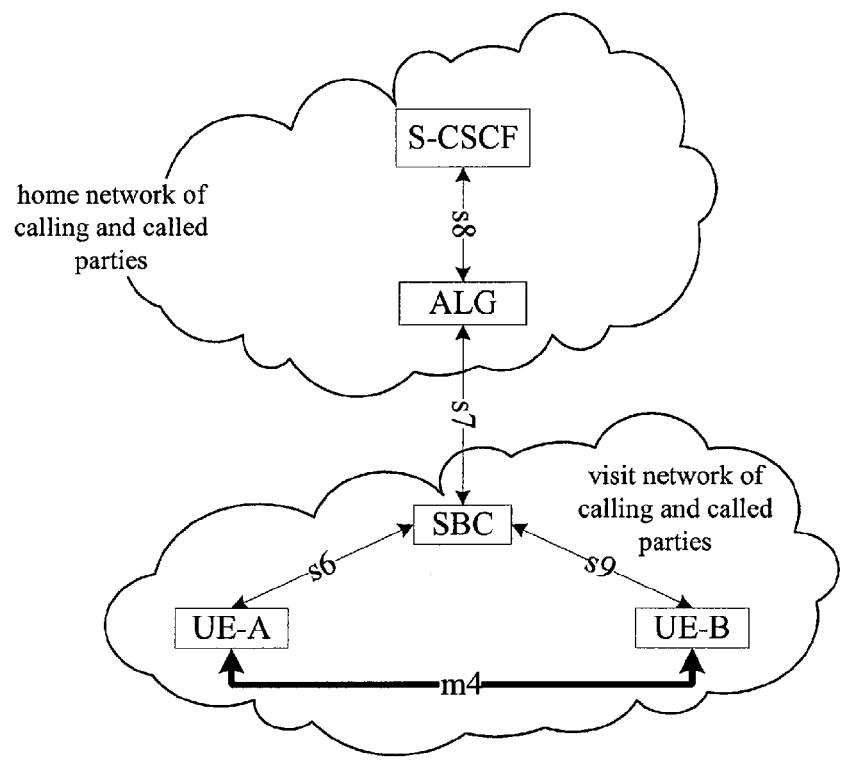
Figure 11:
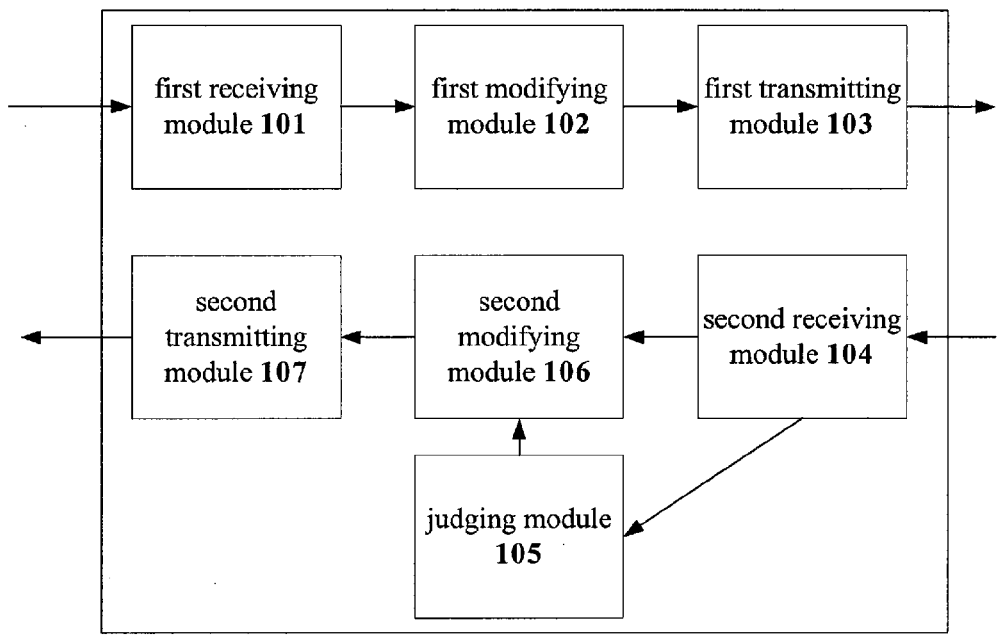
Figure 12:
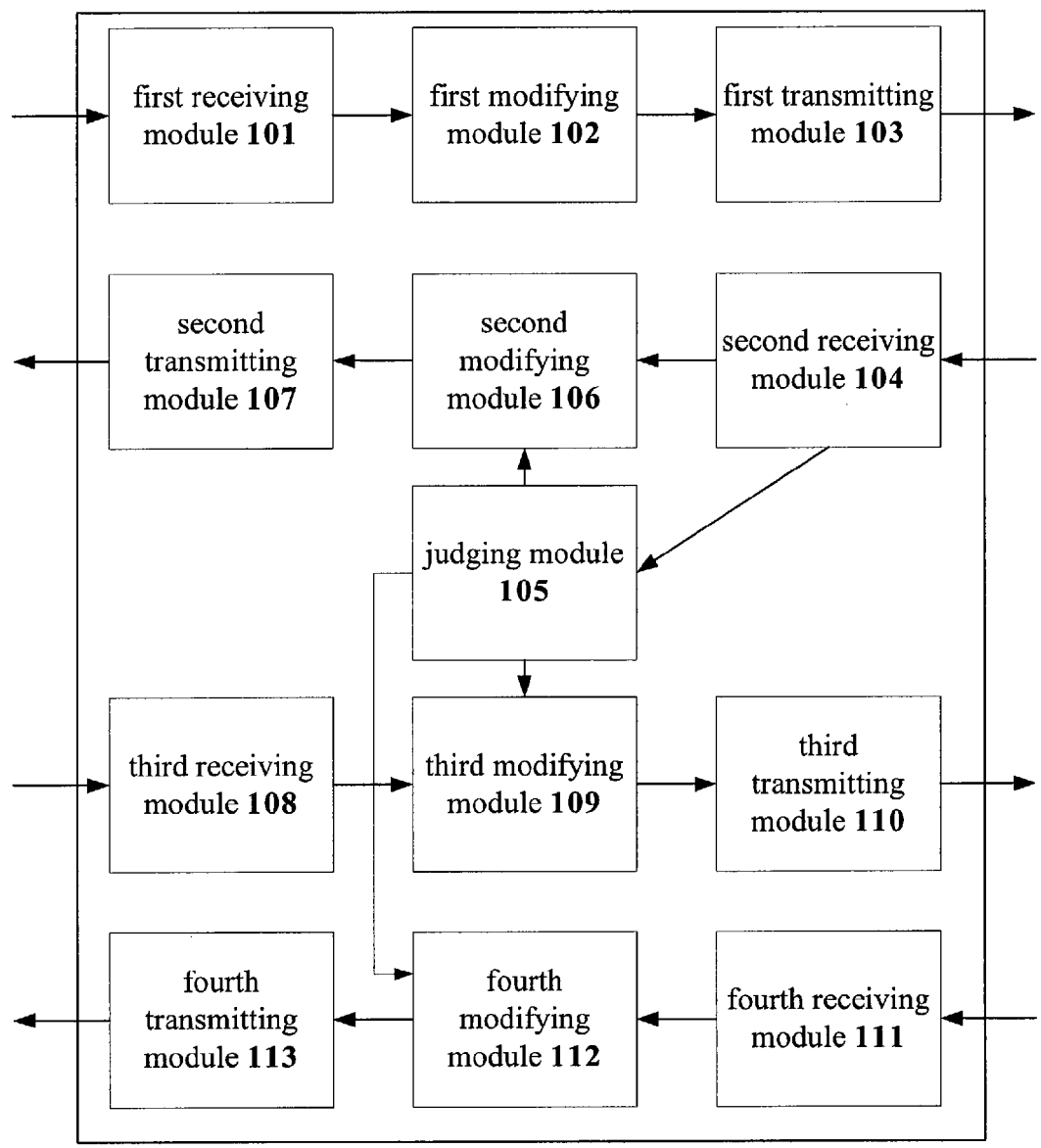

FIG. 4 is a flow chart of Embodiment 2;
FIG. 5 is a flow chart of Embodiment 3;
FIG. 6 is a flow chart of Embodiment 4;
FIG. 7 is a flow chart of Embodiment 5;
FIG. 8 is a flow chart of Embodiment 6;
FIG. 9 is a flow chart of Embodiment 7;
FIG. 10A is a schematic diagram of the result of media path establishment of the preferred Embodiment 1 of the embodiments of the present invention;
FIG. 10B is a schematic diagram of the result of media path establishment of the preferred Embodiment 2 of the embodiments of the present invention;
FIG. 11 is a block diagram of a signaling media gateway of an embodiment of the present invention; and
FIG. 12 is a block diagram of another signaling media gateway of an embodiment of the present invention.

DETAILED DESCRIPTION OF THE EMBODIMENTS

Brief Description on Functions

In the embodiments of the present invention, when a UE-A of the IMS network calls a UE-B according to the prior art, for example, when sending an INVITE request message, an SDP offer whose content is the media resource information of the UE-A is carried in the message, when the request is transmitted in the signaling media gateways in the IMS network, the transmission path is recorded, and when the UE-B receives the INVITE request, if the returned response message carries the above SDP offer, when the response message reaches each signaling media gateway, the signaling media gateway judges whether it is the path node of this call according to the recorded path, and records the judgment result, in the subsequent process of media path establishment, each signaling media gateway forwards an update message according to whether it is a path node, and thereby, establishes an optimized media path.

The embodiments of the present invention and the features of the embodiments can be combined with each other if there is no conflict.

The preferred embodiments of the present invention are described in conjunction with the drawings herein as follows. It shall be understood that the preferred embodiments described herein are only used to describe and explain the present invention and shall not be construed as improper limitations on the same.

Prior to describing the embodiments of the present invention, a premise referred to in the embodiments of the present invention is explained firstly: in practice, each signaling media gateway has two sides, generally, the two sides of each signaling media gateway belong to different sub-networks, and each signaling media gateway allocates a network segment identifier for each side respectively, wherein the network segment identifier can be arbitrary character string, and the network segment identified by one network segment identifier can include one or multiple sub networks. All of the network segments connected with the signaling media gateways which supports the present invention and are within a single operator form a set (the network segments between two adjacent signaling media gateways are the same, so there is only one network segment in the set), the network segment identifiers of the network segments in the set are different from each other. It is feasible to make the network segment identifiers physically and globally unique by making the network segment identifiers contain an operator identifier; or to make the network segment identifiers logically and globally unique by making the network segment identifiers of the gateways for interaction and isolation between operators contain the operator identifier such that the network segment identifiers of the gateways belonging to a single operator defaultedly contain the operator identifier.

According to an embodiment of the present invention, a path node determining method is provided firstly. The method is used to determine, in the IMS network which includes multiple signaling media gateways, a signaling media gateway which serves as a path node of one call.

Figure 2A:
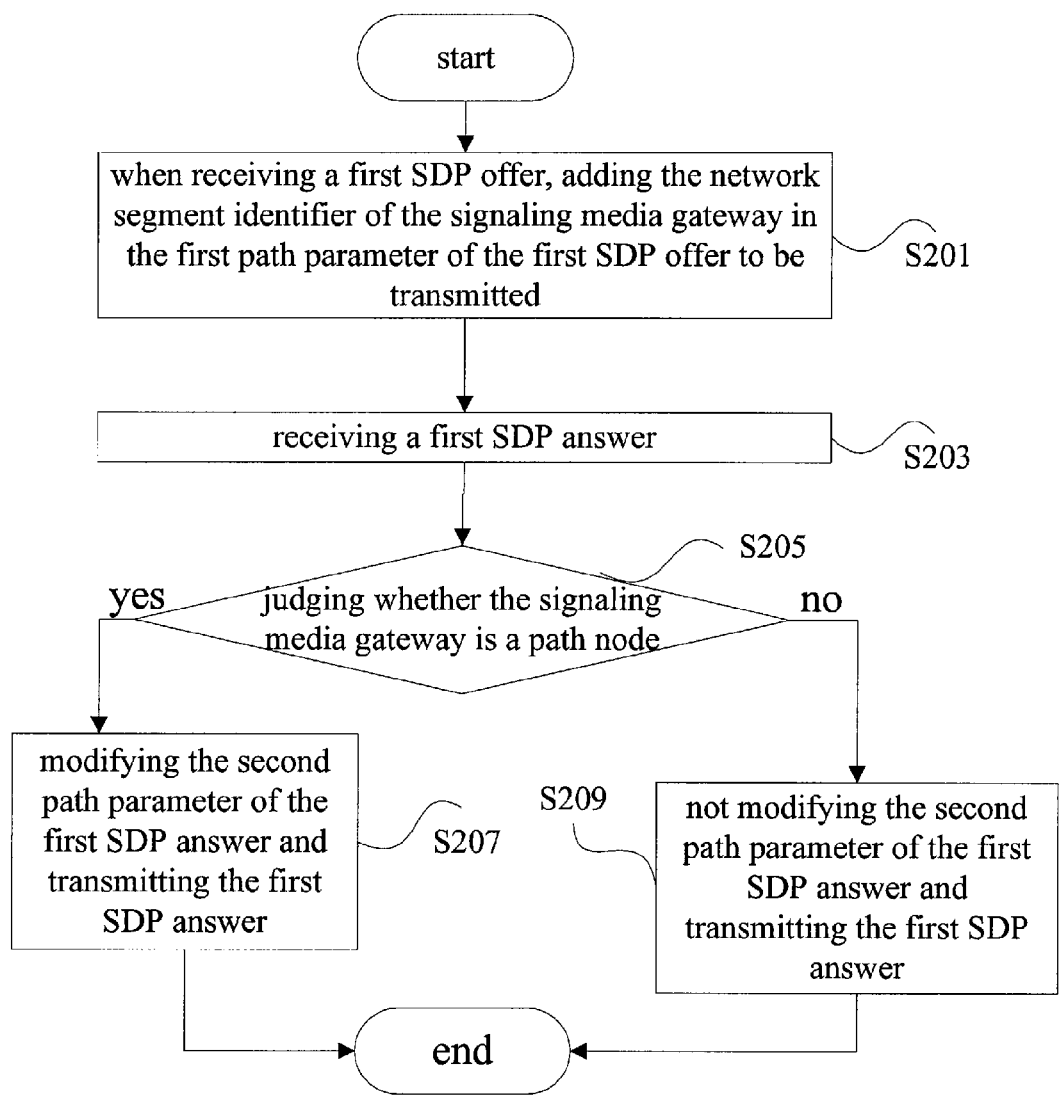
FIG. 2A is a flow chart of the path node determining method according to an embodiment of the present invention.

FIG. 2A is a flow chart of the path node determining method according to an embodiment of the present invention. As shown in FIG. 2A, for any signaling media gateway in the IMS network, the path node determining method according to an embodiment of the present invention mainly includes the following steps (step S201-step S209):

step S201: when receiving a first SDP offer, the network segment identifier of the signaling media gateway is added in a first path parameter of the first SDP offer to be transmitted, and then the first SDP offer is transmitted;

step S203: the signaling media gateway receives a first SDP answer;

step S205: the signaling media gateway judges, according to a second path parameter in the first SDP answer or the first path parameter in the first SDP offer, whether the signaling media gateway is a path node; if yes, step S207 is carried out, otherwise, step S209 is carried out;

step S207, the second path parameter of the first SDP answer to be transmitted is modified, and then the first SDP answer is transmitted; and step S209, the second path parameter of the first SDP answer to be transmitted is not modified, and then the first SDP answer is transmitted.

The details of the above steps are further described as follows.

(1) step S201

In specific implementation process, when receiving the first SDP offer, firstly the signaling media gateway judges whether the first SDP offer carries a path parameter, and/or, whether the first path parameter carried in the first SDP offer is empty, when the first SDP offer does not carry a path parameter and/or the path parameter carried is empty, the signaling media gateway adds the network segment identifier of the entry side for receiving the first SDP offer to the tail of the first path parameter, then, adds the network segment identifier of the exit side for transmitting the first SDP offer to the tail of the first path parameter; if the path parameter carried in the first SDP offer is not empty, the signaling media gateway adds the network segment identifier of the exit side for transmitting the first SDP offer to the tail of the first path parameter.

(2) step S205

In specific implementation process, after the signaling media gateway receives the first SDP answer of the first SDP offer, the signaling media gateway needs to judge whether the signaling media gateway is a path node, specifically, whether the signaling media gateway is a path node can be judged according to the method as follows.

step 1, the signaling media gateway judges whether the first SDP answer carries a second path parameter, if yes, step 3 is carried out, otherwise, step 2 is carried out;

step 2, the first path parameter in the first SDP offer transmitted by the signaling media gateway is obtained, nodes after a predetermined node are deleted and the modified first path parameter is used as the second path parameter, and step 3 is carried out, wherein the predetermined node is the most forward node of the nodes whose network segment identifiers are the same as the network segment identifier of the end node in the first path parameter;

step 3, whether it is necessary for the signaling media gateway to be a path node is judged;

particularly, it is feasible to judge whether it is necessary for the signaling media gateway to be a path node according to the operator strategy or according to whether the media in the first SDP answer has used encoder information inserted into the transmitted SDP offer by the signaling media gateway, if yes, the transmitted first path parameter is taken as the second path parameter;

step 4, whether the network segment identifier of the end node in the second path parameter is the same as the network segment identifier of the exit side, if yes, step 5 is carried out, otherwise, step 6 is carried out;

step 5, it is determined that the signaling media gateway is a path node;

in specific implementation process, in step 3, when it is judged that it is necessary for the signaling media gateway to be a path node, step 4 may not be carried out, and the signaling media gateway is directly determined to be a path node;

step 6, it is determined that the signaling media gateway to be a non-path node.

(3) step S207

After determining the signaling media gateway to be a path node, it is further required to modify the second path parameter, and the specific process includes:

(1) the end node in the second path parameter is deleted;

(2) the most forward node connected with the signaling media gateway is searched in the second path parameter in which the end node has been deleted, and the nodes after the searched node are deleted.

Then, the signaling media gateway further needs to judge whether the subsequent nodes support the receiving of the second path parameter. Specifically, it is possible to determine whether the subsequent nodes support the receiving of the second path parameter by judging whether the first SDP offer received by the signaling media gateway carries the first path parameter and/or whether the first path parameter carried is empty, if it is judged that the received first SDP offer does not carry the first path parameter and/or the first path parameter carried is empty, the signaling media gateway does not carry the second path parameter in the first SDP answer to be transmitted; otherwise, the signaling media gateway carries the second path parameter in the first SDP answer to be transmitted.

(4) step S209

If the signaling media gateway is not a path node, the second path parameter in the above first SDP answer is not modified. Moreover, if the subsequent nodes of the signaling media gateway do not support the receiving of the second path parameter, the second path parameter is not carried in the first SDP answer, otherwise, the second path parameter is carried in the first SDP answer.

The path node determining method according to the embodiments of the present invention can optimize the path nodes and the media paths established subsequently, and thereby, save the equipment resources.

According to an embodiment of the present invention, a media path establishing method is provided, which is applied in the IMS network including multiple signaling media gateways.

Figure 2B:
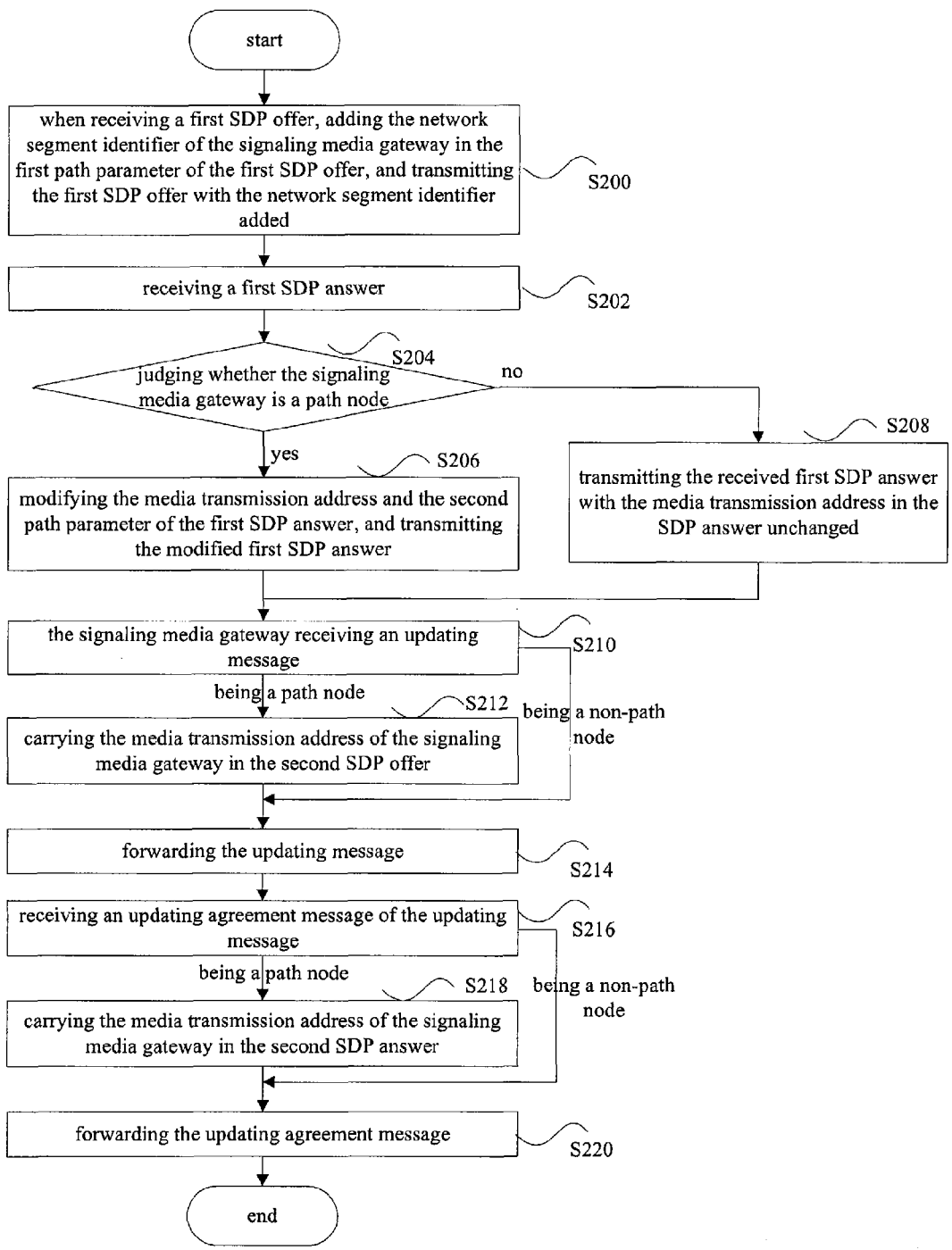
FIG. 2B is a flow chart of the media path establishing method according to an embodiment of the present invention.

FIG. 2B is a flow chart of the media path establishing method according to an embodiment of the present invention. As shown in FIG. 2B, for any signaling media gateway in the IMS network, the media path establishing method according to the embodiment of the present invention mainly comprises the steps as follows.

Step S200, when a first session description protocol (SDP) offer is received, a network segment identifier of the signaling media gateway is added in a first path parameter of the first SDP offer, and the first SDP offer with the network segment identifier added is transmitted.

Step S202, the signaling media gateway receives a first SDP answer.

Step S204, when receiving the first SDP answer, the signaling media gateway judges whether the signaling media gateway is a path node according to a second path parameter in the first SDP answer or the first path parameter in the transmitted first SDP offer, if yes, step S206 is carried out, otherwise, step S208 is carried out.

The specific judging process is similar to that in FIG. 2A, and here we will not go further on this point.

Step S206, a media transmission address and the second path parameter of the first SDP answer are modified, and the modified first SDP answer is transmitted.

Step S208, the received first SDP answer is transmitted without modifying the media transmission address in the SDP answer.

Step S210, the signaling media gateway receives an update message, if the signaling media gateway is a path node, step S212 is carried out, otherwise, step S214 is carried out.

Step S212, the signaling media gateway carries the media transmission address of the signaling media gateway in a second SDP offer.

If the update message does not carry the second SDP offer, the signaling media gateway modifies the media transmission address of the received first SDP offer, and transmits the modified first SDP offer which is carried in the update message which is used as the second SDP offer.

In specific implementation process, the signaling media gateway can further carry a third path parameter in the second SDP offer carried in the transmitted update message, wherein the third path parameter includes at least one of the following: the media transmission address used by the signaling media gateway, the number of encoders in the first SDP offer or in the second SDP offer.

Step S214, the update message is forwarded.

Step S216, the signaling media gateway receives an update agreement message of the update message, if the signaling media gateway is a path node, step S218 is carried out, otherwise, step S220 is carried out.

Step S218, the signaling media gateway carries the media transmission address of the signaling media gateway in the second SDP answer.

Specifically, if the update message carries the second SDP offer, then, if the third path parameter carried in the received second SDP offer contains the information of the number of the encoders and if the location of the encoder information, which is used in the first SDP answer, in the second SDP offer does not exceed the location indicated by the information of the number of the encoders, negotiation is performed using the media transmission address in the third path parameter, and a fourth path parameter is carried in the second SDP answer of the update agreement message to be transmitted, wherein the fourth path parameter includes at least one of the following: the media transmission address used by the signaling media gateway.

Thus, after receiving the update agreement message, the method further comprises: if the received update agreement message carries the second SDP answer, the signaling media gateway judges whether the received second SDP answer contains the fourth path parameter, if yes, negotiation is performed using the media transmission address in the fourth path parameter.

Step S220, the update agreement message is forwarded.

An optimized media path can be established according to the media path establishing method of the embodiments of the present invention.

In order to make it easy to understand the above technical solutions provided in the embodiments of the present invention, the specific implementing manners of the present invention are described as follows through specific embodiments. For the convenience of explanation, in the following embodiments, explanation is conducted by taking three gateways as an example. However, the present invention is not limited to this. Regarding the cases in which the number of gateways is not three, and in which there are gateways which support or do not support the present invention between two gateways in the embodiments, those skilled in this art could obtain the corresponding solutions according to the technical solutions described in the embodiments of the present invention.

Embodiment 1

Figure 3:
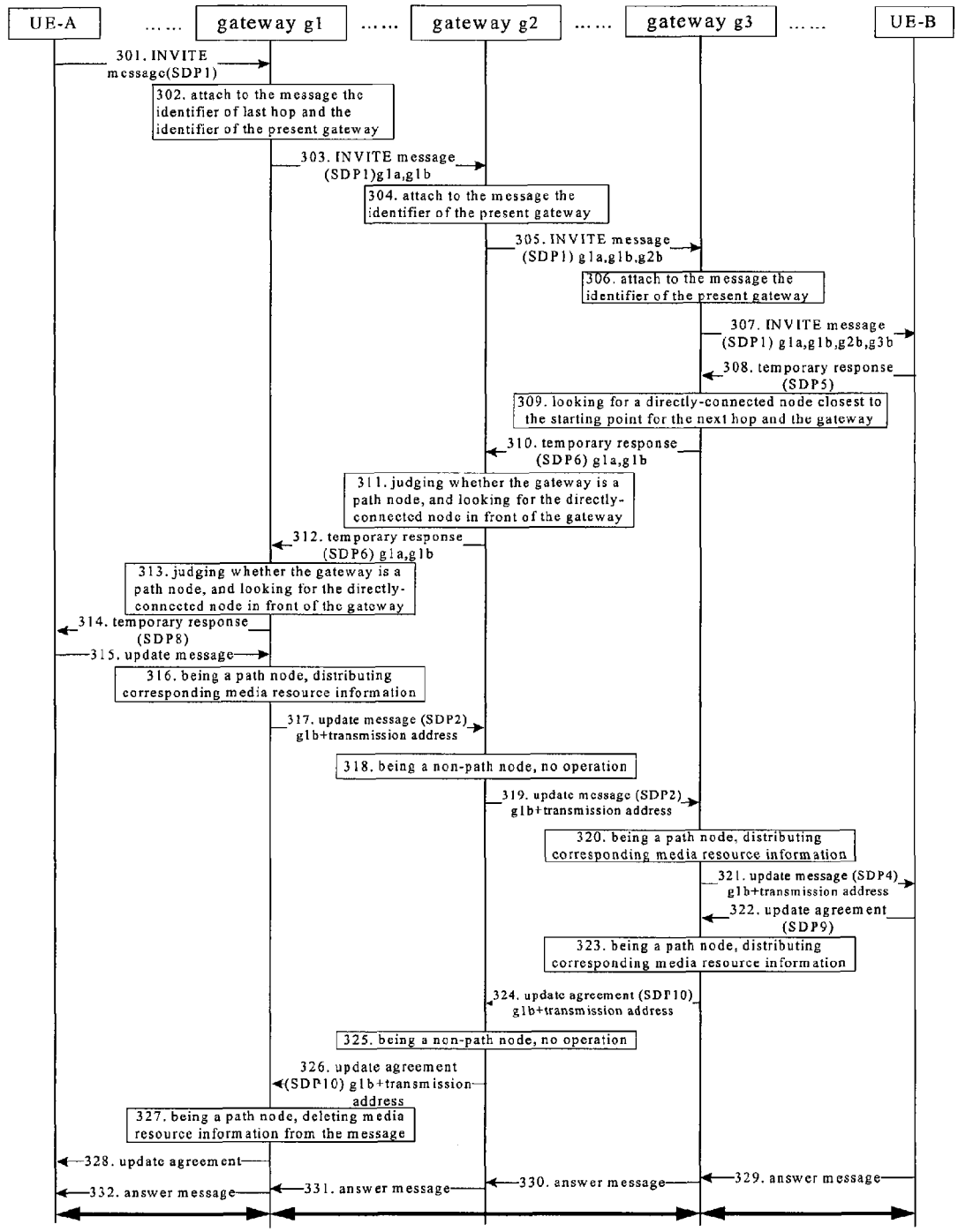
FIG. 3 is a flow chart of Embodiment 1.

FIG. 3 shows the flow chart of this embodiment. In the course of a UE-A calling a UE-B described in the present embodiment, the UE-A does not need resource reservation, and has obtained the corresponding resources when calling, the signaling media gateways g1, g2, and g3 all support the present invention, and each of the signaling media gateways can realize the process of optimizing the media path according to the technical solutions of the embodiments of the present invention. As shown in FIG. 3, the embodiment mainly includes the steps as follows.

Step 301, the UE-A calls the UE-B according to the prior art, for example, sending an INVITE request message carrying an SDP offer whose content is media resource information SDP1 of the UE-A, and specifically, the SDP offer can be carried in the message body.

Step 302, the INVITE request passes the gateway g1, and the gateway g1 performs the logic of modifying the path parameter.

Particularly, the procedure of the gateway g1 performing the logic of modifying the path parameter can be implemented as follows: if the SDP offer does not carry a path parameter or the path parameter carried is empty, the network segment identifier of the entry side where the gateway receives the message is added to the tail of the path parameter, and then, the network segment identifier of the exit side where the gateway transmits the message is added to the tail of the path parameter of the message, otherwise, only the network segment identifier of the exit side of the gateway is added to the tail of the path parameter of the message.

In this embodiment, the result of carrying out the above step is: the path parameters sequentially contain the network segment identifier g1a of the entry side of the gateway g1 and the network segment identifier g1b of the exit side of the gateway g1.

The SDP can include multiple kinds of media, thus, the path parameters either can be common to all the media, for example, being indicated in the header domain of a message, similar to the form of "P-Media-Path:ue-a,g1", or being indicated by an SDP parameter before the beginning of the media line indicated by "m= . . . " of the SDP, similar to the form of "a=path:ue-a,g1"; or can belong to different media respectively, for example, being indicated by an SDP parameter after the media line indicated by each "m= . . . " of the SDP, similar to the form of "a=path:ue-a,g1".

Step 303, the gateway g1 modifies the path parameter in the message according to the result of step 302, but does not modify the media transmission address information (viz. IP address or domain name added with the port number) in the SDP information, adds new codec information for each media according to the requirements, and then, forwards the message.

Step 304, the INVITE request passes the gateway g2, and the gateway g2 performs the logic of modifying the path parameter described in step 302.

The result of the example is that the path parameter is added with the network segment identifier g2b of the exit side where the gateway g2 transmits a message.

Step 305, the gateway g2 modifies the path parameter in the message according to the result of step 304, but does not modify the media transmission address information (IP address or domain name added with the port number) in the SDP information, adds new codec information to each media according to the requirements, and then, forwards the message.

Steps 306-307 are identical to steps 304-305, except that the gateway g2 is changed into the gateway g3.

Step 308, the request message reaches the UE-B, and the UE-B sends a temporary response message, for example, sending a "183 Session Progress" message carrying an SDP answer whose content is the media resource information SDP5 of the UE-B, for example, carrying the media resource information SDP5 in the message body.

Step 309, the temporary response message passes the gateway g3, when the g3 finds that the temporary response message or the SDP answer carried in the message does not carry a path parameter or the path parameter is empty, the path parameter of the transmitted SDP offer is used to search for the directly-connected node, closest to the top end, of the last node, the specific algorithm is as follows:

taking out the network segment identifiers from the information of the last node, checking in the path parameters whether there are identical network segment identifiers in the information of the node closest to the top end, if there are identical network segment identifiers, deleting all of the other node information after the node information found in the path parameter.

In the embodiment, the result of performing the above algorithm is: g3b=g3b; after the algorithm is performed, the algorithm of judging a path node is performed specifically as follows:

judging whether the last node information of the path parameter contains the network segment identifier of the exit side of the gateway, if not, further judging whether the signaling media gateway provides additional functions other than directly forwarding the media data, if additional functions are provided, marking the gateway as a path node and substituting the path parameter in the received message with the path parameter of the transmitted SDP offer, if additional functions are not provided, marking the gateway as a non-path node.

Particularly, it can be judged that, in the SDP answer in the temporary response message, the media has used the encoder which is inserted by the gateway into the SDP offer, and then the gateway must become a path node, so as to provide a code conversion function.

If the last node information of the path parameter contains the network segment identifier of the exit side of the gateway, the gateway is marked as a path node.

If the gateway is a path node, the last node information of the path parameter is deleted.

The result of the algorithm of the embodiment is that the present gateway is a path node, after the algorithm is performed, an algorithm of searching for the directly-connected node, closest to the top end, of the last node is performed.

The result of the algorithm of the embodiment is g2b=g1b, then the path parameter only contains g1a and g1b sequentially.

Step 310, the gateway g3 modifies the path parameter in the message according to the result of step 309, and in the embodiment, the present gateway is a path node, then the media transmission address information in the SDP information of the message is modified to the allocated transmission address of the sub-network of the entry side, and then, the temporary response message is transmitted.

In the specific implementation process, it is feasible to add the modified transmission address information in the message, for example, adding the modified transmission address information in the last node information of the path parameter.

Step 311, the temporary response message passes the gateway g2, g2 finds that the response message or the SDP answer carried in the message carries a path parameter, then the algorithm of judging a path node in step 309 is performed, and the operation result of the embodiment is that the present gateway is not a path node.

Step 312, according to the result of step 311, the present gateway is not a path node in the embodiment, then neither the media transmission address information in the SDP information in the message nor the path parameter in the message is modified, then the temporary response message is forwarded.

Step 313, the temporary response message passes the gateway g1, g1 finds that the response message or the SDP answer carried in the message carries a path parameter, then the algorithm of judging a path node in step 309 is performed, the operation result of the embodiment is that the present gateway is a path node.

Step 314, the gateway g1 finds that the received SDP offer does not carry a path parameter or the path parameter carried is empty, then deletes the path parameter in the SDP answer, in the embodiment, the present gateway is a path node, then the media transmission address information in the SDP answer information is modified to the allocated transmission address of the sub-network of the entry side, and then, the temporary response message is forwarded.

Step 315, the UE-A receives the temporary response message, and sends, according to the requirements of the existing flow, an update message which does not carry an SDP, for example, sending a PRACK (pre-acknowledgement) message.

Step 316, the update message passes the gateway g1, the gateway g1 judges itself to be a path node, further determines that the update message does not carry an SDP offer, thus substitutes the media transmission address in the received SDP offer with the transmission address, allocated by the gateway g1, of the sub-network of the exit side, and adds encoder information for the media according to the requirements, moreover, the gateway g1 can add the substituted transmission address information in the message, for example, setting the path parameter as containing the substituted transmission address information.

Step 317, according to the result of step 316, the gateway g1 adds the generated SDP offer to the update message (for example, the SDP offer is carried in the message body), and then the update message is forwarded.

Step 318, the update message passes the gateway g2, the gateway g2 itself is not a path node, and thereby, does not modify the message.

Step 319, the gateway g2 forwards the update message which is not modified.

Step 320, the update message passes the gateway g3, the gateway g3 judges that it is a path node, and further judges that the update message carries an SDP offer, then the gateway g3 substitutes the media transmission address in the received SDP offer with the transmission address, allocated by the gateway g3, of the sub-network of the exit side.

Specifically, the gateway g3 also can add encoder information for the media according to the requirements, and add the substituted transmission address information in the message, for example, setting the path parameter as containing the substituted transmission address information, thus, the gateway g3 can also perform the following operation:

judging whether the information of the path parameter contains the transmission address information, if yes, performing media negotiation processing by using the transmission address information therein instead of the transmission address information of the corresponding media in the SDP offer.

Step 321, according to the result of step 320, the gateway g3 adds the generated SDP offer to the update message (for example, the SDP offer is carried in the message body), and forwards the update message.

Step 322, the UE-B receives the update message, and returns an update agreement message according to the prior art, for example, sending a "200 OK" response, the message body carrying an SDP answer whose content is the updated media resource information of the UE-B.

Step 323, the update agreement message passes the gateway g3, the gateway g3 judges that the message carries an SDP answer, and further judges that the gateway g3 is a path node, then the gateway g3 modifies the media transmission address information in the SDP answer information to the allocated transmission address of the sub-network of the entry side, if the received update message contains a path parameter, it is also feasible to add the substituted transmission address information in the message, for example, setting the path parameter as containing the substituted transmission address information.

Step 324, according to the result of step 323, the gateway g3 substitutes the SDP answer in the message with the generated SDP answer, and then forwards the update agreement message.

Step 325, the update agreement message passes the gateway g2, the gateway g2 judges that the message carries the SDP answer, and determines that the gateway g2 is not a path node, thus, the SDP answer is not modified.

Step 326, according to the result of step 325, the gateway g2 forwards the update agreement message which is not modified.

Step 327, the update agreement message passes the gateway g1, the gateway g1 judges that the message carries the SDP answer, determines the gateway g1 to be a path node, since the received update message does not carry an SDP offer, the SDP answer in the message is deleted, if the previously received update message does not contain a path parameter, no path parameter is added, and the gateway g1 also can perform the following operation: judging whether the information of the path parameter contains the transmission address information, if yes, performing media negotiation processing by using the transmission address information therein instead of the transmission address information of the corresponding media in the SDP answer.

Step 328, the gateway g1 forwards the update agreement message which does not carry an SDP answer to the UE-A.

Steps 329-332, the UE-B answers the call, for example, sending a "200 OK" message, the message passes the gateways g3, g2, g1, and finally reaches the UE-A.

Till now, communication is established between the UE-A and the UE-B, and the media path goes through the gateway g1 and the gateway g3.

Embodiment 2

FIG. 4 is a flow chart of the embodiment. In the process of the UE-A calling the UE-B described in the present embodiment, the UE-A does not need resource reservation, and has obtained the corresponding resources when calling, the gateways g1 and g3 both support the present invention, and the gateway g2 also supports the present invention, but the gateway g2 must be a path node according to the requirements of the operator. As shown in FIG. 4, the embodiment mainly includes the steps as follows.

Steps 401-403, the same steps as steps 301-303 in FIG. 3 are carried out.

Step 404, the INVITE request passes the gateway g2, after deleting the path parameter, the gateway g2 modifies, according to the prior art, the media transmission address information (IP address or domain name added with the port number) in the SDP information to the allocated transmission address of the sub-network of the exit side, adds new codec information for each media according to the requirements, and forwards the message.

Step 405, the INVITE request passes the gateway g3, and the gateway g3 performs the logic of modifying the path parameter of step 302 in FIG. 3.

The result of the embodiment is that the path parameter sequentially contains the network segment identifier g3a of the entry side of the gateway g3 and the network segment identifier g3b of the exit side of the gateway g3.

Step 406, the gateway g3 modifies the path parameter in the message according to the result of step 405, but does not modify the media transmission address information (IP address or domain name added with the port number) in the SDP information, adds new codec information for each media according to the requirements, and then, forwards the message.

Step 407, the request message reaches the UE-B, the UE-B sends a temporary response message, for example, sending a "183 Session Progress" message carrying an SDP answer whose content is media resource information SDP5 of the UE-B, for example, the SDP answer is carried in the message body.

Step 408, the temporary response passes the gateway g3, the logic performed by g3 is the same as that performed in step 309 in FIG. 3, the result of the embodiment is that the present gateway is a non-path node, the path parameter is modified as g3a, the gateway g3 determines that the received INVITE message does not carry a path parameter or the path parameter is empty, then deletes the path parameter in the SDP answer.

Step 409, as the gateway g3 is a non-path node, the media transmission address information in the SDP answer is not modified, and the temporary response message is forwarded.

Step 410, the temporary response message passes the gateway g2, g2 modifies, according to the prior art, the media transmission address information (IP address or domain name added with the port number) in the SDP information to allocated transmission address of the front side sub-network, and then, forwards the message.

Step 411, the temporary response message passes the gateway g1, the logic performed by g1 is the same as that performed in step 309 in FIG. 3, the result of the embodiment is that the present gateway is a non-path node, the path parameter is modified as g1a, the gateway g1 finds that the previously received INVITE message does not carry a path parameter or the path parameter is empty, then deletes the path parameter in the SDP answer.

Step 412, as the gateway g1 is a non-path node, the gateway g1 does not modify the media transmission address information in the SDP answer, and then forwards the temporary response message.

Step 413, the UE-A receives the temporary response message, and sends, according to the requirements of the current flow, an update message which does not carry an SDP, for example, sending a PRACK (pre-acknowledgement) message.

Step 414, the update message passes the gateway g1, the gateway g1 judges itself to be a non-path node, and then forwards the update message.

Step 415, the update message passes the gateway g2, the gateway g2 directly forwards the update message according to the prior art.

Step 416, the update message passes the gateway g3, the gateway g3 judges itself to be a non-path node, and then forwards the update message.

Step 417, the UE-B receives the update message, and returns an update agreement message according to the prior art, for example, sending a "200 OK" response.

Step 418, the update agreement message passes the gateway g3, the gateway g3 judges itself to be a non-path node, and then, forwards the update agreement message.

Step 419, the update agreement message passes the gateway g2, the gateway g2 directly forwards the update agreement message according to the prior art.

Step 420, the update agreement message passes the gateway g1, the gateway g1 judges itself to be a non-path node, and then, forwards the update agreement message.

Steps 421-424, the UE-B answers the call, for example, sending a "200 OK" message, the message passes the gateways g3, g2, g1 and finally reaches the UE-A.

Till now, communication is established between the UE-A and the UE-B, and the media path goes through the gateway g2.

Embodiment 3

FIG. 5 is a flow chart of the embodiment. In the process of the UE-A calling the UE-B described in the embodiment, the UE-A needs resource reservation and has not obtained the corresponding resources when calling, and the gateways g1 and g3 both support the present invention, but the gateway g2 does not support the present invention. The embodiment mainly includes the steps as follows.

Steps 501-503, the same steps as steps 301-303 in FIG. 3 are carried out.

Step 504, the INVITE request passes the gateway g2, the gateway g2 modifies, according to the prior art, the media transmission address information (IP address or domain name added with the port number) in the SDP information to the allocated transmission address of the sub-network of the exit side, adds new codec information for each media according to the requirements, and forwards the message.

Step 505, the INVITE request passes the gateway g3, and the gateway g3 performs the logic of modifying the path parameter in step 302 in FIG. 3.

The result of the embodiment is that the path parameter sequentially contains a front side network segment identifier g1a of the gateway g1, a rear side network segment identifier g1b of the gateway g1, and a rear side network segment identifier g3b of the gateway g3.

Step 506, the gateway g3 modifies the path parameter in the message according to the result of step 505, but does not modify the media transmission address information (IP address or domain name added with the port number) in the SDP information, adds new codec information for each media according to the requirements, and then, forwards the message.

Step 507, the request message reaches the UE-B, the UE-B sends a temporary response message, for example, sending a "183 Session Progress" message carrying an SDP answer whose content is media resource information SDP5 of the UE-B, for example, the SDP answer is carried in the message body.

Step 508, the temporary response passes the gateway g3, g3 performs the logic of step 309 in FIG. 3, the algorithm result of the embodiment is that the present gateway is a path node, the path parameter only contains g1a and g1b sequentially.

Step 509, the gateway g3 modifies the path parameter in the message according to the result of step 508, in the embodiment, the present gateway is a path node, then the media transmission address information in the SDP information in the message is modified to the allocated transmission address of the sub-network of the entry side, the modified transmission address information can also be added in the message, for example, being added in the last node information of the path parameter, and then, the temporary response message is forwarded.

Step 510, the temporary response message passes the gateway g2, g2 modifies, according to the prior art, the media transmission address information (IP address or domain name added with the port number) in the SDP information to the allocated transmission address of the front side sub-network, and then, forwards the message.

Step 511, the temporary response message passes the gateway g1, g1 finds that the response message or the SDP answer carried in the message carries a path parameter, then the algorithm of judging a path node in step 309 is performed, the operation result in the embodiment is that the present gateway is a path node.

Step 512, the gateway g1 finds that the previously received INVITE message does not carry a path parameter or the path parameter is empty, then deletes the path parameter in the SDP answer, in the embodiment, the present gateway is a path node, then the media transmission address information in the SDP answer information is modified to the allocated transmission address of the sub-network of the entry side, and then, the temporary response message is forwarded.

Step 513, the UE-A receives the temporary response message, and sends, according to the requirements of the current flow, an update message carrying an SDP indicating that the resource has been reserved, for example, sending an UPDATE message.

Step 514, the update message passes the gateway g1, the gateway g1 judges that the gateway g1 is a path node, and further judges that the update message carries an SDP offer, then the gateway g1 substitutes the media transmission address in the received SDP offer with the allocated transmission address of the sub-network of the exit side, and adds encoder information for the media according to the requirements, the gateway g1 further can add the substituted transmission address information in the message, for example, setting the path parameter as containing the substituted transmission address information.

Step 515, according to the result of step 514, the gateway g1 adds the generated SDP offer to the update message (for example, carrying the SDP offer in the message body), and then, forwards the update message.

Step 516, the update message passes the gateway g2, the gateway g2 modifies, according to the prior art, the media transmission address information (IP address or domain name added with the port number) in the SDP information to the allocated transmission address of the sub-network of the exit side, and then, forwards the message.

Step 517, the update message passes the gateway g3, the gateway g3 judges that the gateway g3 is a path node, and judges that the update message carries an SDP offer, then the gateway g1 substitutes the media transmission address in the received SDP offer with the allocated transmission address of the sub-network of the exit side, and add encoder information for the media according to the requirements, the gateway g1 further can add the substituted transmission address information in the message, for example, setting the path parameter as containing the substituted transmission address information, and the gateway g3 can also perform the following operation:

judging whether the information of the path parameter contains the transmission address information, if yes, performing media negotiation processing by using the transmission address information therein instead of the transmission address information of the corresponding media in the SDP offer.

Step 518, according to the result of step 517, the gateway g3 adds the generated SDP offer to the update message (for example, the SDP offer is carried in the message body), and then forwards the update message.

Step 519, the UE-B receives the update message, and returns an update agreement message according to the prior art, for example, sending a "200 OK" response, the message body carrying an SDP answer whose content is the updated media resource information of the UE-B.

Step 520, the update agreement message passes the gateway g3, the gateway g3 judges that the message carries an SDP answer, and determines that the gateway g3 is a path node, then the gateway g3 modifies the media transmission address information in the SDP answer information to the allocated transmission address of the sub-network of the entry side, if the previously received update message contains a path parameter, it is also feasible to add the substituted transmission address information in the message, for example, setting the path parameter as containing the substituted transmission address information.

Step 521, according to the result of step 520, the gateway g3 substitutes the SDP answer in the message with the generated SDP answer, and then forwards the update agreement message.

Step 522, the update agreement message passes the gateway g2, the gateway g2 modifies, according to the prior art, the media transmission address information (IP address or domain name added with the port number) in the SDP information to the allocated transmission address of the sub-network of the entry side, and then, forwards the message.

Step 523, the update agreement message passes the gateway g1, the gateway g1 judges that the message carries an SDP answer, and determines that the gateway g1 is a path node. As the previously received update message carries the SDP offer, the gateway g1 modifies the media transmission address information (IP address or domain name added with the port number) in the SDP information to the allocated transmission address of the sub-network of the entry side, if the previously received update message does not contain a path parameter, no path parameter is added, and the message is then forwarded, and the gateway g1 also can perform the following operation:

judging whether the information of the path parameter contains the transmission address information, if yes, performing media negotiation processing by using the transmission address information therein instead of the transmission address information of the corresponding media in the SDP answer.

Step 524, the gateway g1 forwards the update agreement message carrying the SDP answer to the UE-A.

Steps 525-528, the UE-B answers the call, for example, sending a "200 OK" message, the message passes the gateways g3, g2, g1, and finally reaches the UE-A.

Till now, communication is established between the UE-A and the UE-B, as the gateway g1 and the gateway g3 respectively use the transmission address in the path parameter for negotiation, the media path is made to bypass the gateway g2, and the media path goes through the gateway g1 and the gateway g3.

Embodiment 4

FIG. 6 is the flow chart of the embodiment. In the process of the UE-A calling the UE-B described in the embodiment, the UE-B does not return an SDP until answering the call, and the gateways g1, g2 and g3 all support the present invention. As shown in FIG. 6, the processing flow of the embodiment mainly includes the steps as follows.

Steps 601-607, the same steps as steps 301-307 in FIG. 3 are carried out.

Steps 608-611, the UE-B rings, and returns a temporary response, for example, sending a "180 Ringing" message, the message passes the gateways g3, g2, g1 and finally reaches the UE-A.

Step 612, the UE-B answers the call, returns an answer message, for example, sending a "200 OK" message, the message body carrying an SDP answer whose content is the media resource information of the UE-B.

Step 613, the answer message passes the gateway g3, the gateway g3 performs the logic of step 309 in FIG. 3, the result of the embodiment is that the present gateway is a path node, the path parameter only contains g1a and g1b sequentially, as the gateway g3 is a path node and the received message is an answer message, the answer message is modified as a temporary response message, for example, a "183 session Progress".

Steps 614-624, the same steps as steps 310-320 in FIG. 3 are carried out.

Step 625, as the SDP answer previously received by the gateway g3 is in the answer message, the gateway g3 adds the generated SDP offer to the update message, for example, adding the generated SDP offer to the UPDATE or reINVITE message, the SDP offer is carried in the message body and then forwarded.

Step 626, the UE-B receives the update message and returns an update agreement message according to the marked process, for example, sending a "200 OK" message, the message body carrying the SDP answer whose content is the updated media resource information of the UE-B.

Steps 627-632, the same steps as steps 323-328 in FIG. 3 are carried out.

Steps 633-635, as the gateway g3 is a path node and the previously received answer message has not been transmitted to the UE-A, the answer message which does not carry the SDP information is then transmitted to the UE-A, for example, transmitting a "200 OK" message, the message passes the gateways g2 and g1 and finally reaches the UE-A.

Till now, communication is established between the UE-A and the UE-B, and the media path goes through the gateway g1 and the gateway g3.

Embodiment 5

FIG. 7 is a flow chart of the embodiment. In the process of the UE-A calling the UE-B described in the embodiment, the UE-B does not return an SDP until answering the call, and the gateways g1, g2 and g3 all support the present invention. As shown in FIG. 7, the processing of the embodiment mainly includes the steps as follows.

Step 701, the UE-A calls the UE-B according to the prior art, for example, UE-A sends an INVITE request message carrying the SDP offer whose content is the media resource information SDP1 of the UE-A, for example, the SDP offer is carried in the message body.

Step 702, the INVITE request passes the gateway g1, the gateway g1 performs the logic of modifying the path parameter in step 302 in FIG. 3, the result of the embodiment is that the path parameter sequentially contains the network segment identifier g1a of the entry side of the gateway g1 for receiving the INVITE request and the network segment identifier g1b of the exit side of the gateway g1 for transmitting the INVITE message, and then the INVITE request is modified to an acquisition request, for example, an OPTION request or a SUBSCRIBE request.

Steps 703-707, steps 703-707 are the same as steps 303-307 in FIG. 3, only that the message is an acquisition message.

Step 708, the UE-B receives the acquisition message and returns an agreement message, for example, if the acquisition message is OPTION, the agreement message is a "200 OK", if the acquisition message is SUBSCRIBE, the agreement message is a NOTIFY message.

Steps 709-713, steps 709-713 are the same as steps 309-313 in FIG. 3, except that the message is an agreement message.

Steps 714-719, the gateway g1 previously received an INVITE message, but has not transmitted the INVITE message to the called party, then the gateway g1 starts to forward the INVITE message, which is performed according to steps 316-321 in FIG. 3, except that the message processed is the INVITE message.

Steps 720-725, steps 720-725 are the same as steps 322-327 in FIG. 3, except that the message processed is an answer message.

Step 726, the INVITE message previously received by the gateway g1 does not carry a path parameter or the path parameter is empty, but carries the SDP offer, then the gateway g1 forwards the answer message to the UE-A after deleting the path parameter in the received SDP answer.

Till now, communication is established between the UE-A and the UE-B, and the media path goes through the gateway g1 and the gateway g3.

Embodiment 6

FIG. 8 is the flow chart of the embodiment. The embodiment describes the process of the UE-A calling the UE-B, wherein the UE-A needs resource reservation and has not obtained the corresponding resources when calling, the gateways g1 and g3 both support the present invention, but the gateway g2 does not support the present invention, meanwhile, the gateway g2 is also responsible for code conversion. As shown in FIG. 8, the processing of the embodiment mainly comprises the steps as follows.

Steps 801-813, steps 801-813 are the same as steps 501-513 in FIG. 5.

Step 814, the update message passes the gateway g1, the gateway g1 judges that the gateway g1 is a path node, and further judges that the update message carries an SDP offer, then the gateway g1 substitutes the media transmission address in the received SDP offer with the allocated transmission address of the sub-network of the exit side, and adds encoder information for the media according to the requirements.

According to the requirements of the standard, the newly added encoder information is sequentially added after the existing encoder information; the substituted transmission address information is also added in the message, for example, setting the path parameter as containing the substituted transmission address information; and the existing encoder information is also added, for example, setting the path parameter as further containing the number of the existing encoders in the current SDP offer.

Step 815, according to the result of step 814, the gateway g1 adds the generated SDP offer to the update message (for example, the SDP offer is carried in the message body), and then forwards the update message.

Step 816, the update message passes the gateway g2, the gateway g2 modifies, according to the prior art, the media transmission address information (IP address or domain name added with the port number) in the SDP information to the allocated transmission address of the rear side sub-network, adds encoder information for the media according to the requirements, and then forwards the message.

Step 817, the update message passes the gateway g3, the gateway g3 judges itself to be a path node, and further judges that the update message carries an SDP offer, then the gateway g3 substitutes the media transmission address in the received SDP offer with the allocated transmission address of the sub-network of the exit side for transmitting the INVITE request, and adds encoder information for the media according to the requirements, the gateway g3 also adds the substituted transmission address information in the message, for example, setting the path parameter as containing the substituted transmission address information, and adds the existing encoder information, for example, setting the path parameter as further containing the number of the existing encoders in the current SDP offer, and the gateway 3 performs the following operations:

judging whether the information of the received path parameter contains the encoder information, if yes, judging whether the encoder information used in the previously received SDP answer is not in the contained encoder information, for example, the location of the used encoder information in the SDP offer exceeds the information of the number of encoders, if yes, it means that some gateway between path nodes g1 and g3 can realize communication only when the gateway performs code conversion function, thus, the transmission address information contained in the information of the path parameter is not used, otherwise, further judging whether the transmission address information is contained, if the transmission address information is contained, performing media negotiation processing by using the transmission address information therein instead of the transmission address information of the corresponding media in the SDP offer.

In the embodiment, the called party uses the encoder information newly added by g2, therefore, g3 uses the received SDP offer to perform the media negotiation.

Step 818, according to the result of step 817, the gateway g3 adds the generated SDP offer to the update message (for example, the SDP offer is carried in the message body), and then forwards the update message.

Step 819, the UE-B receives the update message, and returns an update agreement message according to the prior art, for example, sending a "200 OK" response, the message body carrying an SDP answer whose content is the updated media resource information of the UE-B.

Step 820, the update agreement message passes the gateway g3, the gateway g3 judges that the message carries an SDP answer, and determines that the gateway g3 is a path node, then the gateway g3 modifies the media transmission address information in the SDP answer information to the allocated transmission address of the sub-network of the entry side which is used for receiving the INVITE request, since g3 learns that some gateway between the path nodes g1 and g3 needs to perform code conversion function, the substituted transmission address information is not added.

Step 821, according to the result of step 820, the gateway g3 substitutes the SDP answer in the message with the generated SDP answer, and then forwards the update agreement message.

Step 822, the update agreement message passes the gateway g2, the gateway g2 modifies, according to the prior art, the media transmission address information (IP address or domain name added with the port number) in the SDP information to the allocated transmission address of the front side sub-network, and then, forwards the message.

Step 823, the update agreement message passes the gateway g1, the gateway g1 judges that the message carries the SDP answer, determines itself to be a path node, since the received update message carries an SDP offer, the gateway g1 then modifies the media transmission address information (IP address or domain name added with the port number) in the SDP information to the allocated transmission address of the sub-network of the entry side, and then, forwards the message, since the received update message does not carry a path parameter or the path parameter is empty, no path parameter is added in the SDP information.

Step 824, the gateway g1 forwards the update agreement message carrying the SDP answer to the UE-A.

Steps 825-828, the UE-B answers the call, for example, sending a "200 OK" message, the message passes the gateways g3, g2, g1, and finally reaches the UE-A.

Till now, communication is established between the UE-A and the UE-B, and the media path goes through the gateway g1, the gateway g2 and the gateway g3.

Embodiment 7

FIG. 9 is a flow chart of the embodiment. In the process of the UE-A calling the UE-B which belongs to the same network segment as the UE-A described in the embodiment, the UE-A does not need resource reservation and has obtained the corresponding resources when calling, the gateways g1, g2 and g3 all support the present invention. As shown in FIG. 9, the processing of the embodiment mainly comprises the steps as follows.

Steps 901-912, steps 901-912 are the same as steps 601-612 in FIG. 6.

Step 913, the answer message passes the gateway g3, the gateway g3 performs the logic of step 309 in FIG. 3, and the result of the embodiment is that the present gateway is a non-path node and the path parameter only contains g1a, as the gateway g3 is a non-path node, the answer message is modified as a temporary response message.

Step 914, the gateway g3 adds the modified path parameter to the answer message and then forwards the answer message.

Step 915, the answer message passes the gateway g2, g2 finds that the answer message or the SDP answer carried in the message carries a path parameter, then the algorithm of judging a path node in step 309 is performed, the operation result of the embodiment is that the present gateway is not a path node.

Step 916, according to the result of step 915, the present gateway is not a path node in the embodiment, then the media transmission address information in the SDP information in the message is not modified, and the path parameter in the message is not modified, either, then the answer message is forwarded.

Step 917, the answer message passes the gateway g1, g1 finds that the answer message or the SDP answer carried in the message carries a path parameter, then the algorithm of judging a path node in step 309 is performed, the operation result of the embodiment is that the present gateway is not a path node.

Step 918, the gateway g1 finds that the previously received INVITE message does not carry a path parameter or the path parameter is empty, and deletes the path parameter in the SDP answer, in the embodiment, the present gateway is not a path node, then the media transmission address information in the SDP information in the message is not modified, and then, the answer message is forwarded.

After the UE-A receives the answer message, communication is established between the UE-A and the UE-B, and the media path is the direction connection between the UE-A and the UE-B.

FIG. 10A and FIG. 10B are schematic diagrams of the media path after the terminal UE-A calls the terminal UE-B which belongs to the same operator network as the terminal UE-A and communication is established, by using the above technical solutions provided in the embodiments of the present invention.

Figure 1A:
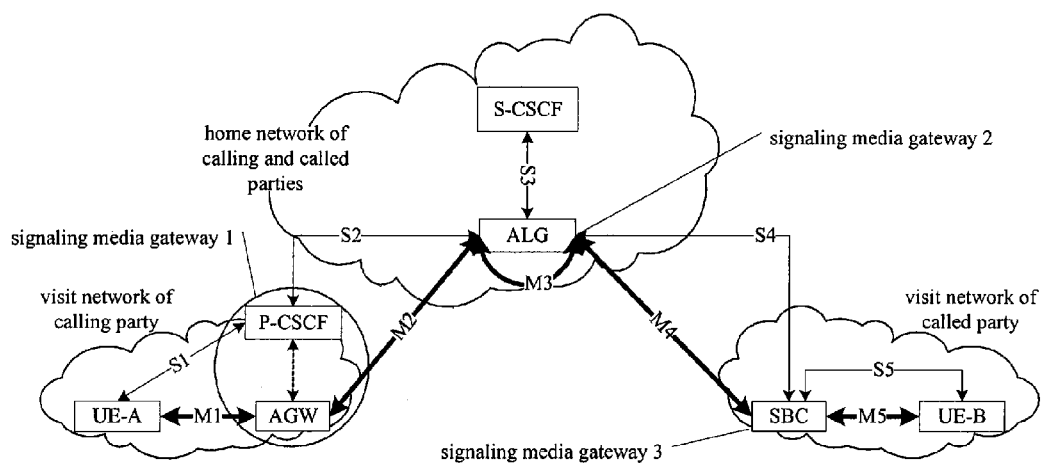
FIG. 1A is a schematic diagram of IMS signaling connection in the related art.
Figure 1B:
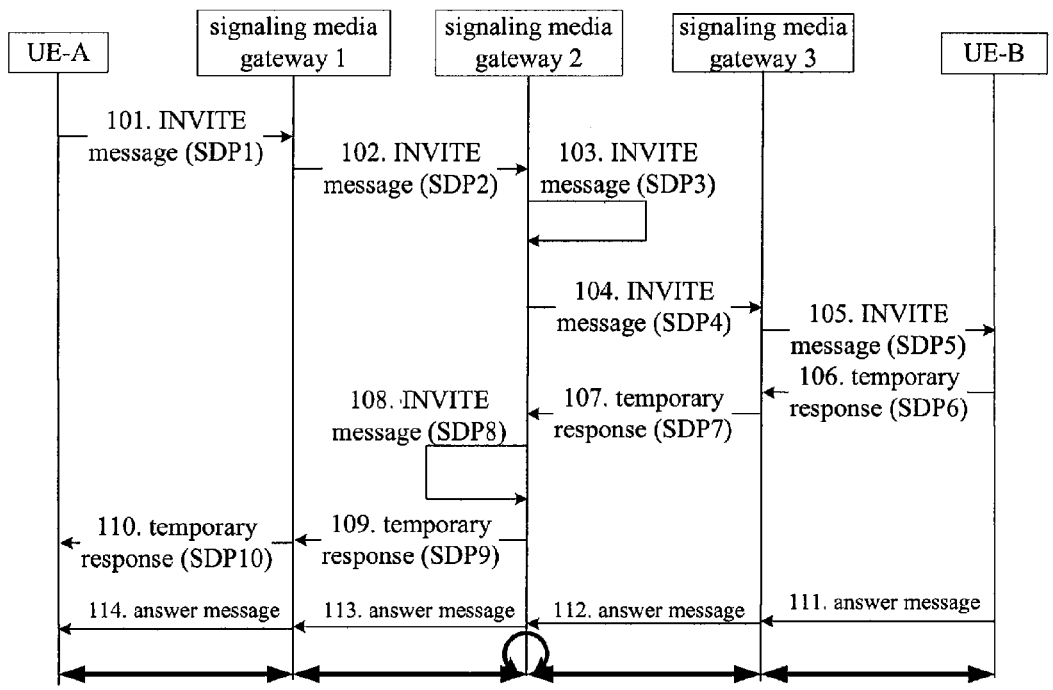
FIG. 1B is a flow chart of the establishment process of IMS signaling and media path in the related art.

In the above, in the case that FIG. 10A has the same background as FIG. 1A, the UE-A and the UE-B roam to different visit networks, the signaling path thereof is the same as that in FIG. 1, and is formed by s1-s2-s3-s3-s4-s5. As a link channel exists between the signaling media gateway 1 of the visit network of the calling party and the signaling media gateway 3 of the visit network of the called party and the media link can be established, by employing the technical solutions provided in the embodiments of the present invention, after communication is established between the UE-A and the UE-B, the media path between the UE-A and the UE-B can bypass the signaling media gateway 2 of the home network of the calling and called parties, viz. the media path is formed by m1-m2-m3.

In FIG. 10B, when the UE-A and the UE-B roam to the same visit network, the signaling path thereof do not need to be optimized, viz. the signaling path is also formed by five segments of s6-s7-s8-s8-s7-s9. As a link channel exists between the UE-A and the UE-B and the media link can be established, by employing the technical solutions provided in the embodiments of the present invention, after communication is established between the UE-A and the UE-B, the media path between the UE-A and the UE-B can bypass the signaling media gateway ALG of the home network of the calling and called parties and the signaling media gateway SBC of the visit network of the calling and called parties, viz. the media path is formed only by m4.

According to an embodiment of the present invention, a signaling media gateway is provided, which can be used to realize the method described in FIG. 2A.

FIG. 11 is a structural block diagram of the signaling media gateway of an embodiment of the present invention. As shown in FIG. 11, the signaling media gateway of the embodiment of the present invention comprises: a first receiving module 101, a first modifying module 102, a first transmitting module 103, a second receiving module 104, a judging module 105, a second modifying module 106 and a second transmitting module 107, wherein the first receiving module 101 is configured to receive a first SDP offer; the first modifying module 102 is connected with the first receiving module 101 and is configured to generate the first SDP offer to be transmitted and to add a network segment identifier of the signaling media gateway in a first path parameter of the first SDP offer; the first transmitting module 103 is connected with the first modifying module 102 and is configured to transmit the first SDP offer generated by the first modifying module; the second receiving module 104 is configured to receive a first SDP answer; the judging module 105 is connected with the second receiving module 104, and is configured to judge whether the signaling media gateway is a path node according to a second path parameter in the first SDP answer or the first path parameter of the transmitted first SDP offer; the second modifying module 106 is connected with the judging module 105 and is configured to generate, according to the judgment result of the judging module 105, the first SDP answer to be transmitted, and correspondingly modify the second path parameter of the first SDP answer; the second transmitting module 107 is connected with the second modifying module 106 and is configured to transmit the first SDP answer generated by the second modifying module 106.

According to an embodiment of the present invention, another signaling media gateway is also provided, and the signaling media gateway can be used to realize the method described in the FIG. 2B.

FIG. 12 is a structural block diagram of the signaling media gateway of an embodiment of the present invention. As shown in FIG. 12, the signaling media gateway of the embodiment of the present invention comprises: a first receiving module 101, a first modifying module 102, a first transmitting module 103, a second receiving module 104, a judging module 105, a second modifying module 106, a second transmitting module 107, a third receiving module 108, a third modifying module 109, a third transmitting module 110, a fourth receiving module 111, a fourth modifying module 112 and a fourth transmitting module 113.

In the above, the first receiving module 101, the first modifying module 102, the first transmitting module 103, the second receiving module 104, the judging module 105, the second modifying module 106 and the second transmitting module 107 substantially serve the same functions as the corresponding modules in FIG. 11, only that the second modifying module 106 modifies the media transmission address and the second path parameter of the first SDP answer, in the case that the judgment result of the judging module 105 is that the signaling media gateway is a path node, and does not modify the media transmission address and the second path parameter of the first SDP answer, in the case that the judgment result of the judging module is that the signaling media gateway is not a path node; and then, the second transmitting module 107 transmits the first SDP answer operated by the second modifying module.

In the above, the third receiving module 108 is configured to receive an update message; the third modifying module 109 is configured to correspondingly modify the update message according to the judgment result of the judging module 105, including whether to modify the media transmission address and whether to add the second SDP offer; the third transmitting module 110 is connected with the third modifying module 109 and is configured to transmit the update message operated by the third modifying module 109; the fourth receiving module 111 is configured to receive an update agreement message of the update message, wherein the update agreement message may carry the second SDP answer; the fourth modifying module 112 is connected with the judging module 105 and the fourth receiving module 111, and is configured to correspondingly modify the update agreement message according to the judgment result of the judging module 105, including modifying the media transmission address carried in the second SDP answer to the media transmission address of the signaling media gateway; the fourth transmitting module 113 is connected with the fourth modifying module 112, and is configured to transmit the update agreement message operated by the fourth modifying module 112.

As described above, by means of the technical solutions provided in the embodiments of the present invention, when a UE-A of the IMS network calls a UE-B according to the prior art, for example, sending an INVITE request message, an SDP offer whose content is the media resource information of the UE-A is carried in the message. When the request is transmitted in the signaling media gateways in the IMS network, the transmission path is recorded, and when the UE-B receives the INVITE request, if the returned response message carries the above SDP offer, when the response message reaches each signaling media gateway, the signaling media gateway judges whether it is the path node of this call according to the recorded path, and records the judgment result, in the subsequent process of media path establishment, each signaling media gateway forwards an update message according to whether it is a path node, and thereby, establishes an optimized media path. Thus, it is possible to effectively reduce the number of the nodes of a media path, and save the resources of media processing equipment.

The descriptions above are only preferred examples of the present invention, which are not used to restrict the present invention. For those skilled in the art, the present invention may have various changes and variations. Any amendments, equivalent substitutions, improvements etc. within the spirit and principle of the present invention are all concluded in the scope of the present invention.

What is claimed is:

1. A path node determining method, used to determine, in an IP Multimedia Subsystem (IMS) network which comprises multiple signaling media gateways, signaling media gateway(s) which serves as media path node(s) of one call, for any one of the signaling media gateways in the IMS network, the method comprising:
    when receiving a first Session Description Protocol (SDP) offer, transmitting a first SDP offer carrying a first path parameter, wherein a network segment identifier of the signaling media gateway is added in the first path parameter of the transmitted first SDP offer;
    when receiving a first SDP answer for the transmitted first SDP offer, judging whether the received first SDP answer carries a second path parameter, if yes, judging, according to the second path parameter in the received first SDP answer, whether the signaling media gateway is a path node, otherwise, judging, according to the first path parameter in the transmitted first SDP offer, whether the signaling media gateway is a path node; and transmitting the first SDP answer.

2. The method according to claim 1, wherein prior to transmitting the first SDP offer carrying the first path parameter, the method comprises:
    the signaling media gateway judging whether the received first SDP offer carries a path parameter, and/or, judging whether contents of the first path parameter carried in the received first SDP offer is non-empty;
    in the case that any one of the judgment results is no, the signaling media gateway adding the network segment identifier of the entry side for receiving the first SDP offer to the tail of the first path parameter of the first SDP offer to be transmitted, then adding the network segment identifier of the exit side for transmitting the first SDP offer to the tail of the first path parameter of the first SDP offer to be transmitted;
    in the case that both of the judgment results are yes, the signaling media gateway adding the network segment identifier of the exit side for transmitting the first SDP offer to the tail of the first path parameter of the first SDP offer to be transmitted.

3. The method according to claim 1, wherein the step of judging whether the signaling media gateway is a path node comprises:
    step 1, the signaling media gateway judging whether the received first SDP answer carries the second path parameter, if yes, carrying out step 3, otherwise, carrying out step 2;
    step 2, the signaling media gateway obtaining the first path parameter in the first SDP offer transmitted by the signaling media gateway, deleting nodes after a predetermined node, using the modified first path parameter as the second path parameter of the received first SDP answer, and carrying out step 3, wherein the predetermined node is the most forward node of the nodes whose network segment identifiers are the same as the network segment identifier of the end node in the first path parameter;
    step 3, the signaling media gateway judging whether the network segment identifier of the end node in the second path parameter of the received first SDP answer is the same as the network segment identifier of the exit side;
    step 4, if it is judged to be the same, determining the signaling media gateway to be a path node, deleting the end node in the second path parameter of the received first SDP answer, then deleting the nodes after a predetermined node, and using the modified second path parameter as the second path parameter of the first SDP answer to be transmitted, wherein the predetermined node is the most forward node of the nodes whose network segment identifiers are the same as the network segment identifier of the end node in the second path parameter of the received first SDP answer.

4. The method according to claim 3, wherein prior to carrying out the step 3, the method further comprises:
    judging whether it is necessary for the signaling media gateway to be used as a path node;
    if yes, using the first path parameter of the transmitted first SDP offer as the second path parameter of the received first SDP answer.

5. The method according to claim 1, wherein the step of transmitting the first SDP answer comprises:
    if the first SDP offer received by the signaling media gateway does not carry a first path parameter or contents of the first path parameter carried is empty, the first SDP answer transmitted by the signaling media gateway does not carry the second path parameter, otherwise, the transmitted first SDP answer carries the second path parameter.

6. The method according to claim 1, wherein the network segment identifier comprises any one or any combination of the following: a character string capable of uniquely identifying different network segments in the IMS network, a sub-network identifier, and an operator identifier.

7. A signaling media gateway, comprising a processor coupled to a memory, the processor is configured to execute a first receiving module, a first modifying module, a first transmitting module, a second receiving module, a judging module, a second modifying module, and a second transmitting module, wherein:
    the first receiving module is configured to receive a first Session Description Protocol (SDP) offer;
    the first modifying module is configured to add a network segment identifier of the signaling media gateway in a first path parameter of the first SDP offer;

the first transmitting module is configured to transmit the first SDP offer operated by the first modifying module;

the second receiving module is configured to receive a first SDP answer;

the judging module is configured to judge whether the first SDP answer received by the second receiving module carries a second path parameter, if the first SDP answer carries the second path parameter, judge whether the signaling media gateway is a path node according to the second path parameter, otherwise, judge whether the signaling media gateway is a path node according to the first path parameter of the first SDP offer transmitted by the first transmitting module;

the second modifying module is configured to generate, according to the judgment result of the judging module, a first SDP answer which needs to be transmitted, and modify a second path parameter of the first SDP answer;

the second transmitting module is configured to transmit the first SDP answer.

8. A media path establishing method, applied to an IP Multimedia Subsystem (IMS) network which comprises multiple signaling media gateways, for any one of the signaling media gateways in the IMS network, the method comprising:

when receiving a first Session Description Protocol (SDP) offer, not modifying a media transmission address in the first SDP offer, but adding a network segment identifier of the signaling media gateway in a first path parameter of the first SDP offer, and then, transmitting the first SDP offer;

when receiving a first SDP answer for the transmitted first SDP offer, the signaling media gateway judging, according to a second path parameter in the first SDP answer or the first path parameter in the transmitted first SDP offer, whether the signaling media gateway is a path node, if not, not modifying a media transmission address of the first SDP answer, but transmitting the first SDP answer;

the signaling media gateway receiving an update message, if the signaling media gateway is a path node and the update message does not carry a second SDP offer, the signaling media gateway modifying the media transmission address of the received first SDP offer, carrying in the update message the modified first SDP offer which is used as a second SDP offer and transmitting the update message; and if the signaling media gateway is not a path node and the update message carries a second SDP offer, not modifying the media transmission address of the second SDP offer, but transmitting the update message;

the signaling media gateway receiving an update agreement message of the update message, if the signaling media gateway is not a path node and the update agreement message carries a second SDP answer, not modifying the media transmission address of the second SDP answer, but transmitting the update agreement message.

9. The method according to claim 8, wherein if the signaling media gateway is a path node, prior to transmitting the update message, the method further comprises:

carrying a third path parameter in the second SDP offer carried in the update message to be transmitted by the signaling media gateway, wherein the third path parameter comprises at least one of the following: the media transmission address used by the signaling media gateway, and the number of encoders in the first SDP offer or in the second SDP offer.

10. The method according to claim 9, wherein after receiving the update message, the method further comprises:

if the update message carries the second SDP offer, then, if the third path parameter carried in the received second SDP offer contains the information of the number of encoders and if the location of the encoder information, which is used in the first SDP answer, in the second SDP offer does not exceed the location indicated by the information of the number of encoders, performing negotiation by using the media transmission address in the third path parameter, and carrying a fourth path parameter in the second SDP answer of the update agreement message to be transmitted, wherein the fourth path parameter comprises at least one of the following: the media transmission address used by the signaling media gateway.

11. The method according to claim 10, wherein after receiving the update agreement message, the method further comprises:

if the received update agreement message carries the second SDP answer, the signaling media gateway judging whether the received second SDP answer contains the fourth path parameter, if yes, performing negotiation by using the media transmission address in the fourth path parameter.

12. The method according to claim 8, wherein if the received first SDP answer is carried in an answer message, after judging the signaling media gateway to be a path node, the method further comprises:

transmitting the first SDP answer to be transmitted by carrying the first SDP answer to be transmitted in a temporary response message; and after transmitting the update agreement message, the method further comprises:

transmitting an answer message which does not carry the first SDP answer.

13. The method according to claim 8, wherein if the received first SDP offer is carried in an invite message, the step of transmitting the first SDP offer comprises:

transmitting the modified first SDP offer by carrying the modified first SDP offer in an acquisition message; and after receiving the first SDP answer, the method further comprises:

not transmitting the first SDP answer, carrying the second SDP offer to be transmitted in the invite message, and transmitting the invite message carrying the second SDP offer which is used as the update message.

14. A signaling media gateway, comprising a processor coupled to a memory, the processor is configured to execute a first receiving module, a first modifying module, a first transmitting module, a second receiving module, a judging module, a second modifying module, a second transmitting module, a third receiving module, a third modifying module, a third transmitting module, a fourth receiving module, a fourth modifying module, and a fourth transmitting module, wherein:

the first receiving module is configured to receive a first Session Description Protocol (SDP) offer;

the first modifying module is configured to add a network segment identifier of the signaling media gateway in a first path parameter of the first SDP offer without modifying a media transmission address of the first SDP offer;

the first transmitting module is configured to transmit the first SDP offer operated by the first modifying module;

the second receiving module is configured to receive a first SDP answer;

the judging module is configured to judge whether the signaling media gateway is a path node according to a second path parameter if the first SDP answer carries the second path parameter or according to the first path parameter of the transmitted first SDP offer if the first SDP answer does not carry the second path parameter;

the second modifying module is configured to modify the media transmission address and the second path parameter of the first SDP answer in the case that the judgment result of the judging module is that the signaling media gateway is a path node, and not modify the media transmission address and the second path parameter of the first SDP answer in the case that the judgment result of the judging module is that the signaling media gateway is not a path node;

the second transmitting module is configured to transmit the first SDP answer operated by the second modifying module;

the third receiving module is configured to receive an update message which carries a second SDP offer or does not carry an SDP offer;

the third modifying module is configured to, in the case that the judgment result of the judging module is that the signaling media gateway is a path node, if the update message carries a second SDP offer, modify the media transmission address of the second SDP offer, otherwise, modify the media transmission address of the first SDP offer, and then, carry the modified first SDP offer or the modified second SDP offer in the update message, and in the case that the judgment result of the judging module is that the signaling media gateway is not a path node, not modify the update message;

the third transmitting module is configured to transmit the update message operated by the third modifying module;

the fourth receiving module is configured to receive an update agreement message of the update message, wherein the update agreement message carries the second SDP answer or does not carry an SDP answer;

the fourth modifying module is configured to, in the case that the judgment result of the judging module is that the signaling media gateway is a path node, the update agreement message is sure to carry the second SDP answer, and if the update message carries a second SDP offer, modify the media transmission address of the second SDP answer, otherwise, delete the second SDP answer from the update agreement message, and in the case that the judgment result of the judging module is that the signaling media gateway is not a path node, not modify the update agreement message; and the fourth transmitting module is configured to transmit the update agreement message operated by the fourth modifying module.

15. The method according to claim 2, wherein the network segment identifier comprises any one or any combination of the following: a character string capable of uniquely identifying different network segments in the IMS network, a sub-network identifier, and an operator identifier.

16. The method according to claim 3, wherein the network segment identifier comprises any one or any combination of the following: a character string capable of uniquely identifying different network segments in the IMS network, a sub-network identifier, and an operator identifier.

17. The method according to claim 4, wherein the network segment identifier comprises any one or any combination of the following: a character string capable of uniquely identifying different network segments in the IMS network, a sub-network identifier, and an operator identifier.

18. The method according to claim 5, wherein the network segment identifier comprises any one or any combination of the following: a character string capable of uniquely identifying different network segments in the IMS network, a sub-network identifier, and an operator identifier.

* * * * *